(12) United States Patent
Janeke

(10) Patent No.: US 6,974,111 B2
(45) Date of Patent: *Dec. 13, 2005

(54) ASONIC AEROSPIKE ENGINE

(76) Inventor: Charl E. Janeke, P.O. Box 27226, Sunnyside (ZA), 0132

( * ) Notice: Subject to any disclaimer, the term of this patent is extended or adjusted under 35 U.S.C. 154(b) by 0 days.

This patent is subject to a terminal disclaimer.

(21) Appl. No.: 10/712,656

(22) Filed: Nov. 13, 2003

(65) Prior Publication Data

US 2005/0017132 A1 Jan. 27, 2005

Related U.S. Application Data

(60) Continuation of application No. 09/829,043, filed on Apr. 9, 2001, now Pat. No. 6,648,275, which is a division of application No. 09/162,930, filed on Sep. 29, 1998, now Pat. No. 6,213,431.

(30) Foreign Application Priority Data

Sep. 30, 1997 (ZA) .................................. 978749

(51) Int. Cl.$^7$ .............................. B64G 1/40; B64G 9/00
(52) U.S. Cl. ........................................ 244/172; 60/204
(58) Field of Search ............................ 244/158 R, 169, 244/172; 60/204, 224

(56) References Cited

U.S. PATENT DOCUMENTS 6,213,431 B1 * 4/2001 Janeke ........................ 244/172
6,648,275 B2 * 11/2003 Janeke ........................ 244/172

* cited by examiner

Primary Examiner—Francis T. Palo
(74) Attorney, Agent, or Firm—Osha Liang LLP

(57) ABSTRACT

A space plane including a main body, an aerospike engine attached to the main body, and a bell-shaped nozzle primary thrust engine attached to the main body.

9 Claims, 20 Drawing Sheets

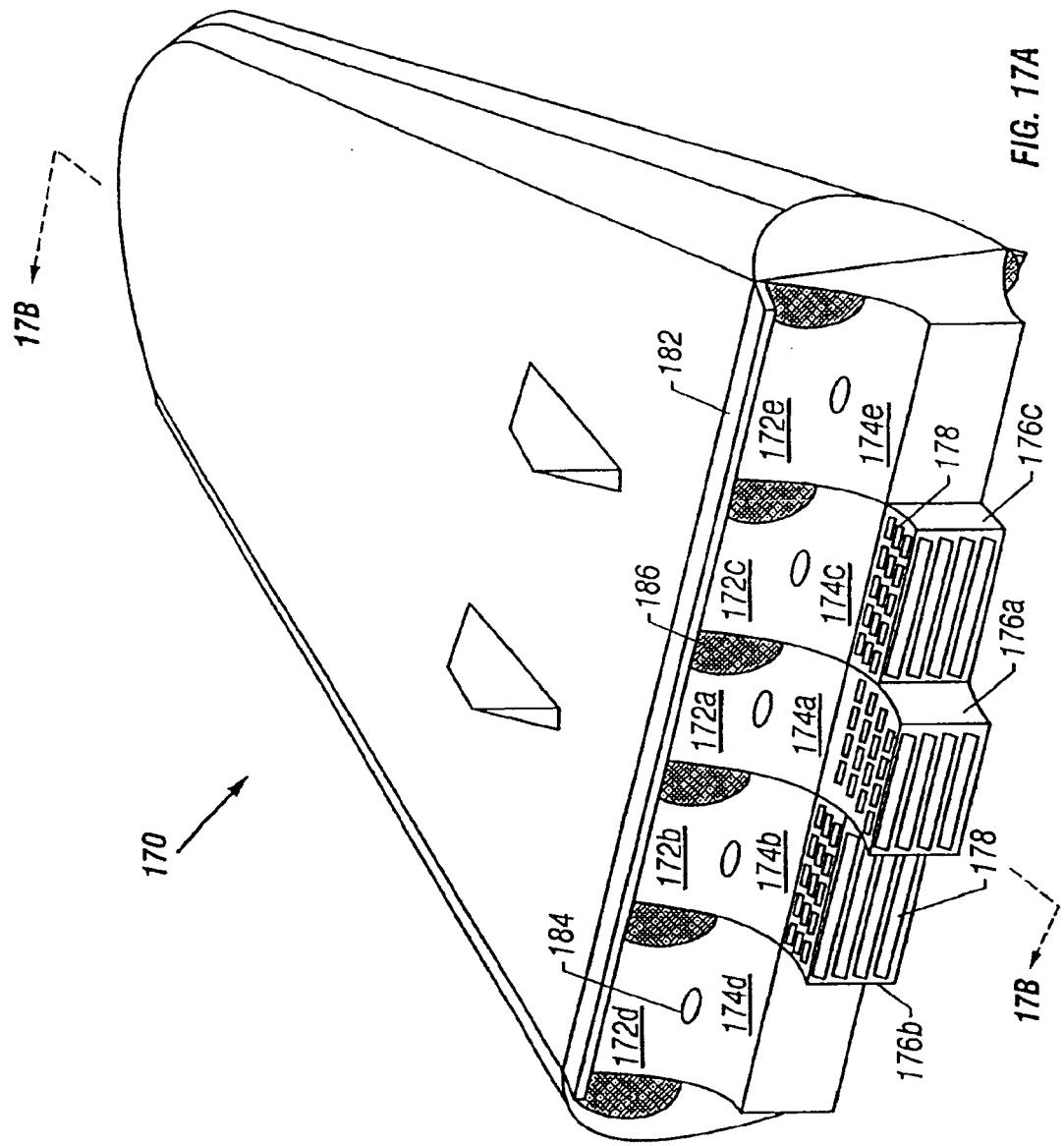

ASONIC AEROSPIKE ENGINE

CROSS-REFERENCE TO RELATED APPLICATIONS

This is a continuation of U.S. patent application Ser. No. 09/829,043, filed on Apr. 9, 2001 (now U.S. Pat. No. 6,648,275), which is a divisional application of U.S. patent application Ser. No. 09/162,930, filed on Sep. 29, 1998 (now U.S. Pat. No. 6,213,431). Both of these are incorporated herein by reference in their entirety.

BACKGROUND OF INVENTION

1. Field of the Invention

The invention relates generally to rocket engines and, in particular, to an aerospike rocket engine.

2. Background Art

Conventional rocket engines use round, bell-shaped nozzles. These nozzles, however, have an inherent limitation in that the combustion gas, or plume inside the nozzle can expand only as far as the shape and length of the nozzle allow, resulting in substantial under and/or over expansion, with a resulting loss of thrust and instability/vibration of the expanding plume. Bell nozzles are, therefore, typically designed for specific applications, e.g., take-off, high altitude, or outer space. However, even within the confines of these applications, under/over expansion invariably occurs due to 1) changes in atmospheric pressure, and 2) a finite expansion capability of approximately 1:400 (where infinite expansion is theoretically required in space), which may result in up to 5% loss of thrust. See, e.g., *Missile Engineering Handbook*, van Nostrand, Fig. 7.1.1, 1957; *Aviation Week & Space Technology*, p. 130, Aug. 10, 1987). Therefore, a bell nozzle having a given size and shape can reach peak efficiency only at an altitude where the plume expansion within the nozzle equals the theoretical expansion that would be permitted by the atmospheric pressure at that altitude.

To overcome the bell nozzle's limitation, Rocketdyne Propulsion and Power ("Rocketdyne"), a subsidiary of the Boeing Co., developed a nozzle which resembles a bell nozzle turned inside-out called an "aerospike" nozzle. More specifically, a linearized version of the aerospike nozzle called a "linear" aerospike nozzle was developed for the proposed X33/VentureStar single-stage-to-orbit ("SSTO") space plane project. The linear aerospike engine resembles a bell-shaped nozzle that has been split in half and the two halves put back-to-back to each other, and the end of nozzle clipped or truncated. In some cases, however, the linear aerospike engine may have only one of the two halves, i.e., a single-sided engine. Because the plume of the aerospike nozzle is manifested on the peripheral of the nozzle, it is free to expand, limited only by atmospheric pressure. As a rocket using the aerospike nozzle climbs higher and higher, the plume is able to expand continuously against the decreasing atmospheric pressure, albeit at a cost to the thrust vector which diverges progressively sideways.

Referring to FIG. 1, there is shown a bank of five linear aerospike engines 10 arranged side-by-side. Each aerospike engine 10 comprises a rectangular wedge or tapered body 12, a slanted or curved reaction surface or plane 14, a leading end 16 and a trailing end 18. Each engine 10 has at least one injector 20 or, more typically, a set of injectors 20 adjacent the leading end 16 and arranged to direct a propellant or fuel down the reaction plane 14 towards the trailing end 18. Upon combustion of the propellant or fuel from the injector 20, the combustion gas, or plume, travels down the reaction plane 14 and exerts propulsive pressure on the reaction plane 14, which provides the thrust for the space plane.

As can be seen, turning to FIGS. 2A–2C, the linear aerospike design allows the plume to expand freely against atmospheric pressure. At low altitude, the exhaust plume 24 is held in a fairly narrow band 26 by the high atmospheric pressure as shown in FIG. 2A. However, referring to FIG. 2B, at high altitude and low atmospheric pressure, the plume 24 is able to expand. Shock waves produced by the supersonic speed of the space plane at high altitude provides a shock front 28 that can assists in resisting the expansion of the plume 24. As the space plane 22 climbs into outer space, the vacuum of space may tend to pull the plume 24 away from the reaction plane 14, as shown in FIG. 2C. This may result in "divergence," wherein the plume's 24 thrust vectors becomes misaligned with the direction of flight, resulting in a decrease in net thrust and, hence, engine efficiency.

One solution to this divergence syndrome is to extend the reaction plane 14 so as to facilitate full expansion of the plume 24. However, because the plume 24 is unconfined, the boundary layer may tend to separate from the reaction plane 14. Boundary layer separation is a lifting off or peeling away of the plume 24 from the reaction plane 14. According to Bernoulli's law, as long as the boundary layer remains sufficiently energized, the plume 24 will adhere to the reaction plane 14 by virtue of the negative pressure between the high-speed boundary layer and the reaction plane 14. As the plume 24 travels along the reaction plane 14, the boundary layer may run out of energy and separate from the reaction plane 14. The effects of boundary layer separation include instability or turbulence which can produce severe mechanical vibrations that can damage the space plane 22. In addition, boundary layer separation may result in a loss of thrust and engine efficiency. Separation usually starts at the end of the boundary layer where the energy of the boundary layer is low. Atmospheric pressure can help to hold the plume 24 against the reaction plane 14. Therefore, separation is more likely to occur at high altitude where the atmospheric pressure is low.

One way of preventing boundary layer separation is by truncating the reaction plane 14 so that the reaction plane 14 is shorter (as can be seen in published illustrations of the X33). This allows the boundary layer to traverse the entire length of the reaction plane 14 before running out of energy. The trade-off, however, is that there is a reduction in thrust and engine efficiency relative to an untruncated reaction plane due to 1) under expansion, and 2) thrust vector diversion/deflection. Furthermore, the shorter reaction plane 14 may not allow the propellant or fuel sufficient time to completely combust/accelerate before reaching the end of the reaction plane 14, which can result in reduced thrust on the reaction plane 14. This reduction in thrust may be critical at high altitudes where the space plane needs to attain very high velocity.

Over and above the truncation limitation of the X33 implementation of the aerospike engine, scaling up of the aerospike plan form to suit larger space plane applications (e.g., the proposed VentureStar heavy lift shuttle) may additionally require cascaded or staged propellant/fuel injection in lieu of the impact of dimensional scaling.

SUMMARY OF INVENTION

In some embodiments, the invention relates to a space plane comprising a main body, an aerospike engine attached to the main body, and a bell-shaped nozzle primary thrust engine attached to the main body.

In some other embodiments, the invention related to a method of operating a space vehicle having a tapered engine body which has a slanted reaction plane. The method includes firing the engine, extending a length of the reaction plane at a predetermined time, and removing decelerated boundary layer fluid from a boundary layer while the reaction plane is extended.

BRIEF DESCRIPTION OF DRAWINGS

FIGS. 17A and 17B are a perspective view and cross-sectional side view, respectively, of a space plane incorporating a reaction plane extension having slits.

DETAILED DESCRIPTION

Throughout the description and the drawings, elements that are the same will be accorded the same reference numbers. Also, hydrogen and oxygen will be referred to as "$H_2$" and "$O_2$," respectively, and the term "propellant" will refer to a fuel-oxidizer combination (e.g., $H_2$—$O_2$).

Figure 3:
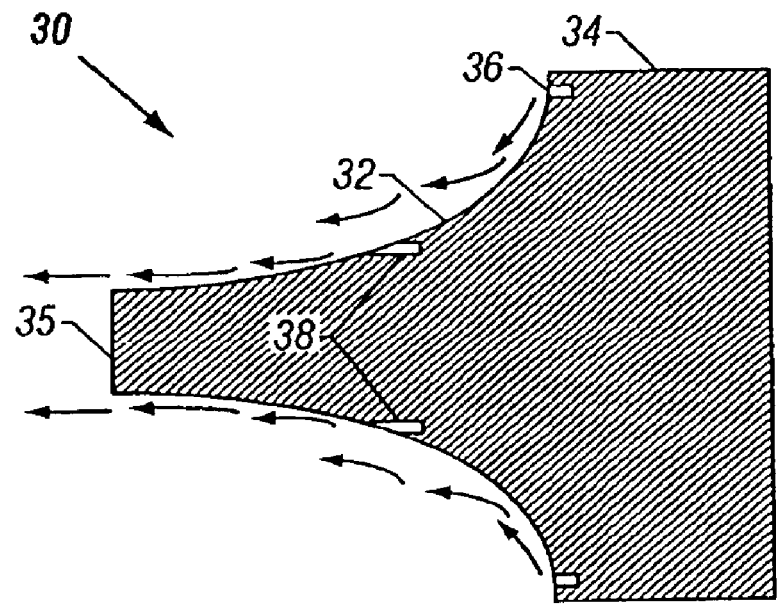
FIG. 3 is a cross-sectional side view of a a linear aerospike engine which incorporates first and second injectors.

In one aspect of the invention, thrust and engine efficiency may be maintained or increased by increasing the propulsive pressure on the reaction plane. Referring to FIG. 3, a linear aerospike engine 30 provides increased pressure on a reaction plane 32 and prevents boundary layer separation by cascading the fuel or propellant down the surface of the curved reaction plane 32. In accordance with this embodiment, the engine 30 is provided with a first set of injectors 36 located adjacent a leading end 34 of the engine 30, and a second set of injectors 38 located generally intermediate the leading end 34 and a trailing end 35 of the engine 30. The rationale here is that the reduction in pressure and boundary layer separation associated with a conventional aerospike engine are believed to take place towards the trailing end 35 where the energy of the boundary layer is lower. For a very large reaction plane 32, for example, this reduction in pressure and boundary layer separation can be substantial. By placing a second set of injectors 38 intermediate the leading end 34 and trailing end 35, the reduction in pressure on the reaction plane 32 may be offset by the additional pressure provided by the combustion gas from the second set of injectors 38. Furthermore, the energy of the combustion gas from the second set of injectors 38 may also rejuvenate the boundary layer and inhibit or prevent separation on smaller space planes.

In operation, the first and second sets of injectors 36 and 38 are both fired during lift-off in order to obtain maximum thrust for take-off. However, in some embodiments, the second set of injectors 38 may be fired a predetermined interval after lift-off, or only when a particular atmospheric pressure is reached. Alternatively, the first and/or second sets of injectors 36 and 38 are selectively modulated or otherwise fired at predetermined times and for predetermined durations throughout the flight in accordance with a predeveloped firing strategy to optimize the thrust and/or engine efficiency.

Although the engine 30 is described with two sets of injectors 36 and 38, additional sets of injectors may be provided as needed. In addition, the location of the second set of injectors 38, and any additional sets of injectors, may be optimized so as to be generally in the middle, or closer to one or the other of the two ends 34, 35, depending on the requirements of the application. Also, the first and second sets of injectors 36 and 38 may use the same type of fuel or each set may use a different fuel. In a preferred embodiment, the second set of injectors 38 uses a $H_2$ and $O_2$ fuel, and the first set of injectors 36 uses a hydrocarbon fuel, such as propane or methane. The advantages of the dual fuel embodiment will be described in detail later in this description.

Figure 4:
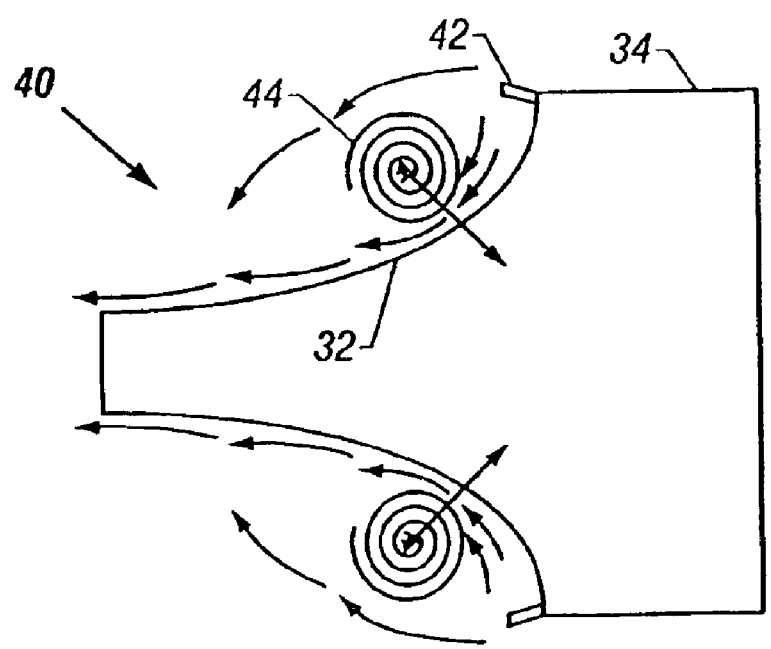
FIG. 4 is a side view of a linear aerospike engine which incorporates a flap or spoiler.

In another embodiment, shown in FIG. 4, a linear aerospike engine 40 increases pressure on the reaction plane 32 by using an adjustable spoiler or flap 42 to induce a vortex 44 on the reaction plane 32 parallel to a lateral axis of the reaction plane 32. The spoiler 42 is attached to the engine 40 adjacent the leading end 34 of the engine 40 such that air passing over the spoiler 42 during flight forms the vortex 44 behind the spoiler 42 as shown. The position or angle of the spoiler 42 may be adjusted by hydraulic means (not shown) known to one of ordinary skill in the art, such as the means used to adjust the flaps on the wings of an airplane. The adjustability of the spoiler 42 allows for mid-flight control of the size, shape, and location of the vortex 44.

The rationale behind this embodiment is to convert the excess kinetic energy of the combustion gas into increased thrust for the engine 40. Theoretically, at optimal propulsion efficiency the velocity of the space plane, hence the velocity of the air passing over the space plane, is equal to the velocity of the combustion gas. However, because the space plane cannot instantly attain the same high velocity as the combustion gas at take-off, some of the kinetic energy of the combustion gas will be unused. Therefore, while the space plane is building up speed during and after take-off, this excess kinetic energy can be tapped to form the vortex 44. In other words, the energy required to form the vortex 44, manifested by the increased drag and air resistance on the space plane due to the spoiler 42, is more than compensated for by the excess energy of the combustion gas such that there is essentially no decrease in the velocity of the space plane. The clockwise rotation of the vortex 44 causes the combustion gas and/or air passing between the vortex 44 and reaction plane 32 to have a higher velocity than the combustion gas and/or air passing on the other side of the vortex 44. The difference in the velocities of the combustion gas and/or air passing over the vortex 44 generates lift (indicated by the straight-line arrow) in much the same way that air passing over an airplane wing generates lift. The difference in velocities also produces a net rotation vector similar to that produced by the airplane wing. The lift and rotation vector increase the pressure on the reaction plane 42, which increases the thrust on the space plane.

An additional advantage of this embodiment is the vortex 48 also draws air towards the reaction plane 42 during atmospheric flight, which effectively reduces the tanked $O_2$ required. This allows the engine 40 to carry a combination of $H_2$ and $O_2$ fuels and a secondary fuel, e.g., a hydrocarbon fuel, due to the reduced tanked $O_2$ requirement. This aspect of the invention will be described in more details infra. In a preferred embodiment, the spoiler 42 is employed in conjunction with the first and second sets of injectors 36 and 38 of FIG. 3 such that, as previously mentioned, the induced air may be used in lieu of tanked $O_2$ to enhance the combustion of the hydrocarbon fuel of the second set of injectors 38.

Figure 5:
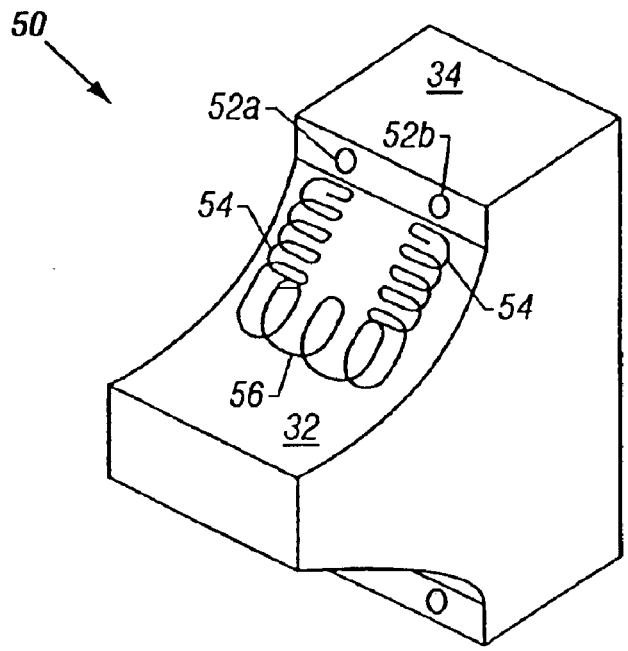
FIG. 5 is a perspective view, of a linear aerospike engine having injectors that direct fuel in counter-current directions.

In another embodiment of the invention, referring to FIG. 5, a linear aerospike engine 50 uses a pair of injectors 52a and 52b to induce a vortex 56 and thereby increase pressure on the reaction plane 32. The injectors 52a and 52b are located adjacent the leading end 34 and direct fuel in counter current directions relative to each other. The resulting helices of combustion gas 54 travel down the reaction plane 32 and then merge together to form the vortex 56 in accordance with so-called "counter swirl induction theory" known to those of ordinary skill in the art. It is important under this theory that injector 52a directs fuel in a counterclockwise direction and injector 52b in a clockwise direction in order for the resultant helices 54 to merge and form the vortex 56.

Although a pair of injectors are shown in this embodiment, in some embodiments, additional injectors may be used as long there are an equal number of counterclockwise and clockwise injectors. For example, there may be four injectors, two on one side of the reaction plane 32 and directing fuel in a counterclockwise direction, and two on the other side of the reaction plane 32, directing fuel in a clockwise direction. Alternatively, there may be two pairs of injectors, each pair having one injector that directs fuel in a counterclockwise direction and the other injector directing fuel in a clockwise direction. In some embodiments, a mechanical appendage such as a vane or fin (not shown) may be attached to the reaction plane 32 to help turn the helices 54.

In operation, combustion gas and/or air passing over the vortex 56 generates lift and a net rotation vector on the reaction plane 32, and draws air onto the reaction plane 32, in much the same way as in the embodiment of FIG. 4.

Figure 6:
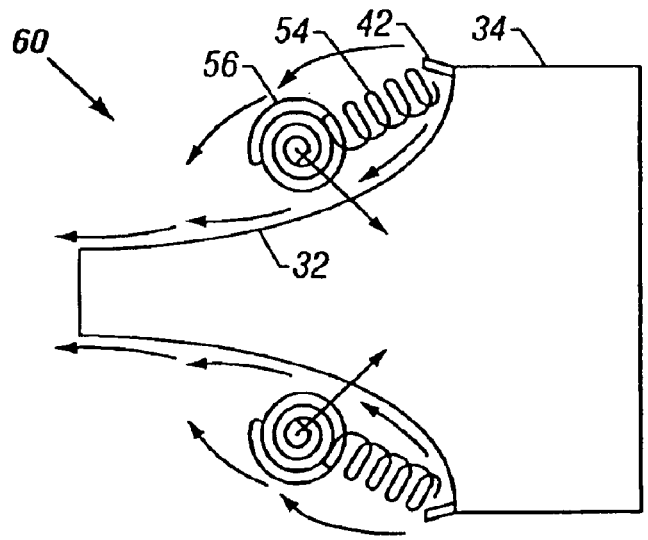
FIG. 6 is a side view of the embodiment of FIG. 5 further equipped with a spoiler.

In a preferred embodiment, referring to FIG. 6, the embodiment of FIG. 5 is equipped with the adjustable spoiler 42 or other mechanical appendages such as a vane or fin (not shown). The spoiler 42 helps to form the vortex 56 by providing an incipient vortex (not shown) that facilitates the formation of the vortex 56. In this embodiment, the injectors 52a and 52b help to stabilize the induced/adjuvant vortex 56 generated by the spoiler 42.

Figure 7:
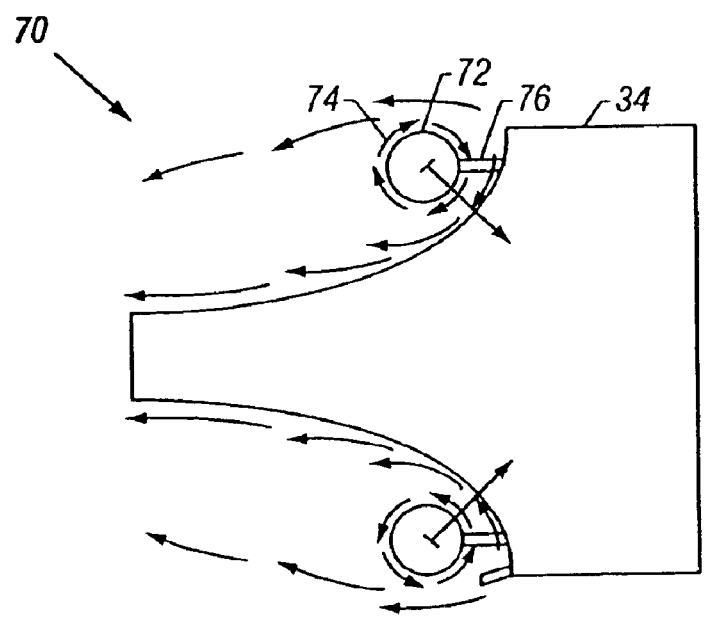
FIG. 7 is a side view of a linear aerospike engine which incorporates a spinning wheel.

In an alternative embodiment, a linear aerospike engine 70 uses a rotatable wheel, turbine or drum 72 to induce a vortex 74 and thereby increase the pressure on the reaction plane 32, as depicted in FIG. 7. The turbine 72 is attached to the engine 70 adjacent the leading end 34 and spaced apart from the reaction plane 34, and may be either a fixed structure or a disposable one which can be jettisoned in mid-flight when no longer needed. A support member 76 connects the turbine 72 to the engine 70 and provides support and stability for the turbine 72. It will be appreciated that other means known to one of ordinary skill in the art for attaching and/or supporting the turbine 70 may be used, and that the actual means of attachment is not critical to the invention.

The turbine 72, in a preferred embodiment, is driven by relatively cool turbo exhaust gas blowing on the turbine 72 from the engine's 70 turbo pump (not shown). However, the turbine 72 may also be driven by other suitable means such as an on-board electric motor (not shown).

Figure 8:
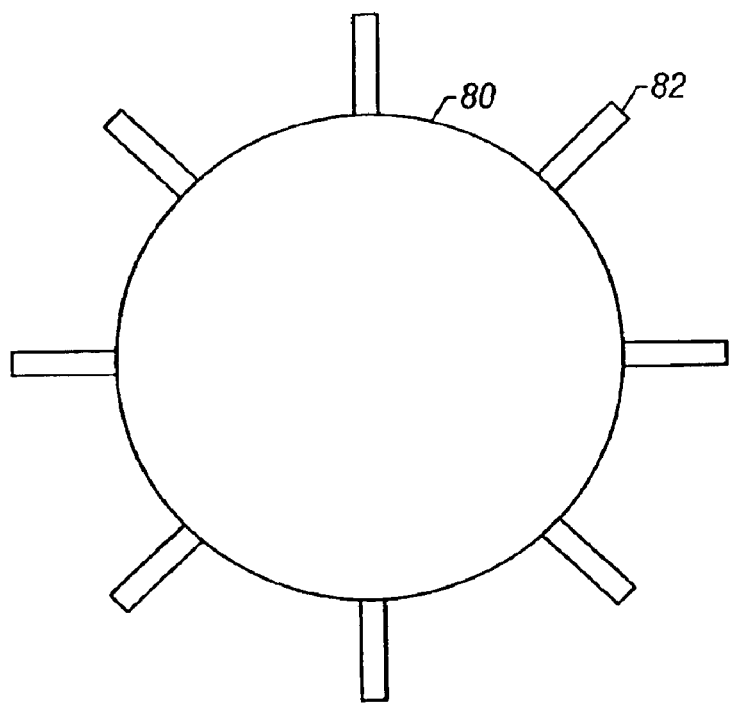
FIG. 8 is a side view of a turbine having paddles.

In some embodiments, the turbine 72 may be smooth, or it may be coated with a special coating that may serve to increase the surface tension between the turbine 70 and the air to help form the vortex 74. In other embodiments, referring to FIG. 8, a turbine 80 may have paddles 82 attached thereto to help facilitate the movement of the air around the turbine 80 and thereby form the vortex.

In operation, as the turbine 72 rotates, it induces a layer of air (akin to the workings of an airplane wing) which circulates around the turbine 72 and forms the vortex 74 parallel to the reaction plane 32. The size and shape of the vortex 74 may be adjusted by modifying the turbine's 72 rotational speed.

Figure 9A:
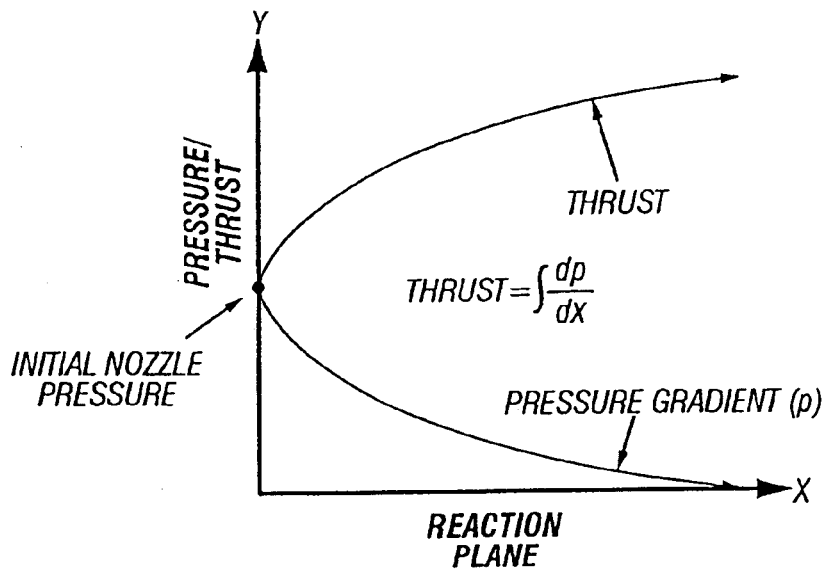
FIGS. 9A and 9B are charts comparing the difference in thrust between a conventional aerospike engine and an aerospike engine of the present invention.

Referring to FIG. 9A, a chart shows the thrust resulting from a conventional aerospike engine. The y-axis represents propulsive pressure or thrust and the x-axis represents the distance traveled along the reaction plane. The "Pressure Gradient (p)" line represents the pressure exerted on the reaction plane by the combustion gas. Note that the pressure is at a maximum at the point where the combustion gas exits the injectors and decreases as the combustion gas travels down the reaction plane. The resulting thrust ("Thrust") is the integration of the pressure gradient (p), which is simply the sum of the area underneath the pressure gradient (p).

Figure 9B:
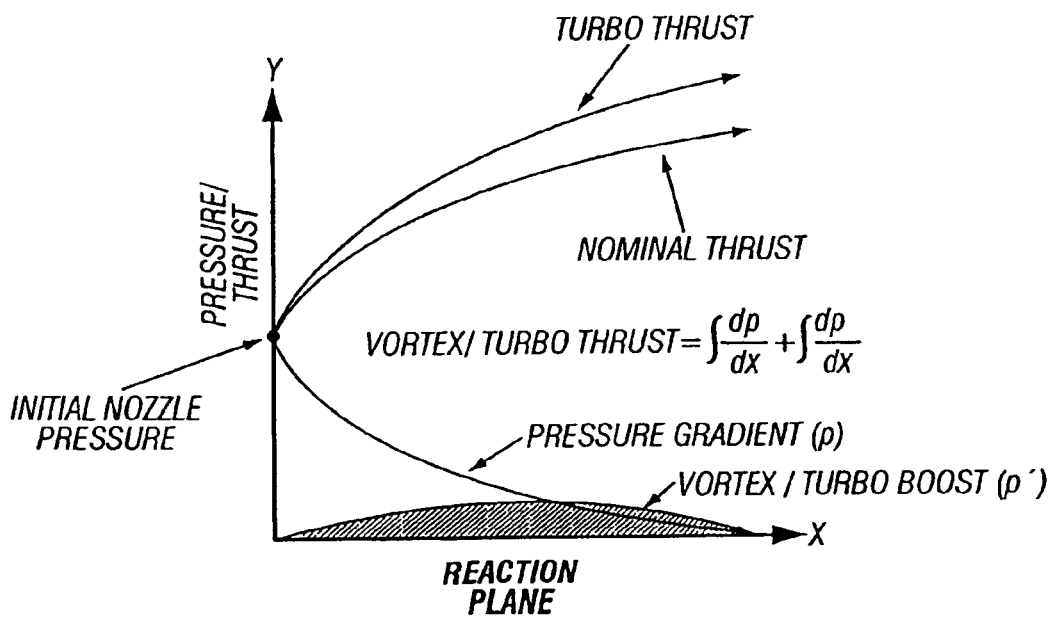

Referring now to FIG. 9B, another chart shows the additional thrust that may be gained by implementing the above described techniques for increasing the pressure on the reaction plane. The "Vortex/Turbo Boost (p')" line represents the additional pressure (p') that may be gained by using a second set of injectors and/or by inducing a vortex parallel to the reaction plane. The resulting thrust ("Vortex/Turbo Thrust") is the sum of the integration of (p) and (p'). As shown by the chart, the increase in the pressure on the reaction plane results in additional thrust for the engine.

One major advantage of the invention is that it will now be possible to use a dual fuel system to power the space plane. In a $H_2$—$O_2$ powered space plane, the majority of the cargo carrying capacity is taken up by the volume of the tankage required to carry the $H_2$ fuel component. For example, $H_2$ requires approximately 5 times more volume than propane. By providing more than one set of injectors (see FIG. 3), it is now possible to inject a primary propellant consisting of $H_2$—$O_2$ from one set of injectors, and a secondary fuel from a second set of injectors. As an example, an $O_2$ enriched hydrocarbon fuel such as methane or propane may be used as the secondary fuel by injecting tanked $O_2$, in part, and employing atmospheric $O_2$, in part. By creating a vortex (see FIGS. 4–8) which draws atmospheric air ($O_2$) towards the reaction plane, combustion of the secondary fuel will be enhanced.

As a result of the use of the secondary fuel, the tankage of the space plane can be reduced substantially by reducing the amount of more expensive $H_2$ and $O_2$ fuels, thus providing greater cargo carrying capacity. In addition, pumping of $H_2$ during take-off is substantially reduced due to the lower $H_2$ consumption, thus allowing a smaller pump to be used and resulting in further savings in mass and cost. This expected increase in payload capacity is illustrated more fully in the following Tables 1 and 2 which are theoretical models of the flight into orbit of the SSTO space plane comparing the use of a single fuel, $H_2$ and $O_2$ (89% $O_2$), and a dual fuel combination of $H_2$ and $O_2$ and an $O_2$ enriched hydrocarbon fuel (76% $O_2$).

Each column of the tables will now be described. Col. 1 and 2 are the elapsed time of the flight in seconds and minutes, respectively.

Col. 3 shows the mass of the space plane as fuel is consumed throughout the flight given a initial mass of 100,000 lbs. Assuming 10% of the take-off mass is attributed to the structural mass of a state-of-the-art space plane, the mass that remains in excess of 10% after the space plane reaches orbit indicates the cargo capacity of the space plane.

Col. 4 shows a reduction in the mass of the $H_2$—$O_2$ propellant consumed throughout the flight. The "1.0" in col. 4 of Table 1 indicates that $H_2$ and °2 make up 100% of the fuels on the space plane. The "330 lb/sec" is the full throttle flow rate of the propellant. Because the space plane of Table 1 carries only $H_2$—$O_2$ propellant, cols. 3 and 4 will be identical to each other. In Table 2, the "0.6" indicates that $H_2$—$O_2$ make up 60% of the propellant carried on the space plane (with hydrocarbon and $O_2$ making up the balance), and the "60 lb/sec" is the flow rate of the propellant.

Col. 5 shows the percentage of the available $H_2$—$O_2$ thrust being used. Initially, 100% (full throttle) of the available thrust from the $H_2$—$O_2$ propellant is used. However, after a certain predetermined interval, the fuel consumption is gradually eased off in the case of Table 1, and sharply cut back in Table 2.

Col. 6 is the actual thrust due to the $H_2$—$O_2$ propellant. The "350" represents the specific impulse of the $H_2$—$O_2$ propellant and is employed in the thrust calculation as follows:

$$thrust = 350 \times 330,$$

where 330 is the flow rate of the $H_2$—$O_2$ propellant in lb/sec.

Col. 7 shows the reduction in the mass of the hydrocarbon and $O_2$ propellant consumed throughout the flight. The "0.4" indicates that hydrocarbon and $O_2$ makes up 40% of the propellant on-board. The "228" is the maximum flow rate of the propellant.

Col. 8 is an air induction factor, which is estimated to be 3.3 for this model.

Col. 9 is the percentage of $O_2$ used during the flight.

Col. 10 is the actual thrust contributed by the hydrocarbon and $O_2$ propellant. The "225" in Col. 10 is an estimated specific impulse for the hydrocarbon fuel, having derated the "250" specific impulse of methane and/or propane by 10% due to the use of atmospheric air in combustion, and is employed as follows:

$$thrust = 225 \times 3.3 \times 228,$$

where 3.3 is the air induction factor and 228 is the flow rate of the hydrocarbon propellant in lb/sec.

Col. 11 is the total thrust, which is the sum of cols. 6 and 10.

Col. 12 is the acceleration of the space plane.

Col. 13 is the velocity of the space plane.

Col. 14 is the percent mass of the space plane throughout the flight until the plane reaches orbit.

Col. 15 is the horizontal distance traveled by the space plane.

Col. 16 is the horizontal distance to vertical distance conversion factor.

Col. 17 is the height attained by the space plane.

For a single fuel space plane, as can be seen in Table 1, col. 14, only 12% of the take-off mass can be carried into orbit. Given a structural mass of 10%, a 12% orbital mass renders a 2% payload only. Referring to Table 2, the comparable orbital mass of a dual-fuel space plane is 14% of the take-off mass, rendering a 4% payload. Thus, an increase of up to 100% payload capacity may be realized by implementing the embodiments of the present invention.

TABLE 1

Single Fuel Space Plane Simulation

| 1<br>Time<br>(sec) | 2<br>Time<br>(min) | 3<br>mass<br>(lb) | 4<br>$H_2 + O_2$<br>1.0<br>330 lb/<br>sec | 5<br>% $H_2$<br>thst | 6<br>$H_2$/thst<br>350 | 7<br>HC + $O_2$<br>0<br>228 lb/sec | 8<br>A/fac<br>3.3<br>0.96 | 9<br>%<br>$O_2$ | 10<br>HC/thst<br>225<br>250 | 11<br>Tot/thst<br>$H_2$ + HC | 12<br>Acc<br>xg | 13<br>Vel<br>ft/sec | 14<br>%<br>mass | 11%<br>2$H_2$<br>4<br>15<br>H. dist<br>* 1000 | 89%<br>+ $O_2$ =<br>+ 32<br>16<br>fact<br>0.87 | 2$H_2O$<br>36<br>17<br>Height<br>* 10 ft |
|---|---|---|---|---|---|---|---|---|---|---|---|---|---|---|---|---|
| 0 | 0 | 100000 | 100000 | 100 | 115500 | 0 | 3.30 | 71 | 0 | 115500 | 1.2 | 0 | 100 | 0 | 1 | 0 |
| 1 | 0 | 99677 | 99677 | 98 | 113190 | 0 | 0.00 | 113 | 0 | 113190 | 1.1 | 37 | 100 | 0.0 | 0.87 | 2 |
| 2 | 0 | 99360 | 99360 | 96 | 110880 | 0 | 0.00 | 113 | 0 | 110880 | 1.1 | 74 | 99 | 0.1 | 0.76 | 7 |

TABLE 1-continued

Single Fuel Space Plane Simulation

| 1 Time (sec) | 2 Time (min) | 3 mass (lb) | 4 H$_2$ + O$_2$ 1.0 330 lb/sec | 5 % H$_2$ thst | 6 H$_2$/thst 350 | 7 HC + O$_2$ 0 228 lb/sec | 8 A/fac 3.3 0.96 | 9 % O$_2$ | 10 HC/thst 225 250 | 11 Tot/thst H$_2$ + HC | 12 Acc xg | 13 Vel ft/sec | 14 % mass | 11% 2H$_2$ 4 15 H. dist * 1000 | 89% + O$_2$ = + 32 16 fact 0.87 | 2H$_2$O 36 17 Height * 10 ft |
|---|---|---|---|---|---|---|---|---|---|---|---|---|---|---|---|---|
| 3 | 0 | 99050 | 99050 | 94 | 108570 | 0 | 0.00 | 113 | 0 | 108570 | 1.1 | 110 | 99 | 0.2 | 0.66 | 17 |
| 4 | 0 | 98746 | 98746 | 92 | 106260 | 0 | 0.00 | 113 | 0 | 106260 | 1.1 | 145 | 99 | 0.3 | 0.57 | 33 |
| 5 | 0 | 98449 | 98449 | 90 | 103950 | 0 | 0.00 | 113 | 0 | 103950 | 1.1 | 180 | 98 | 0.4 | 0.50 | 55 |
| 6 | 0 | 98159 | 98159 | 88 | 101640 | 0 | 0.00 | 113 | 0 | 101640 | 1.0 | 214 | 98 | 0.6 | 0.43 | 81 |
| 7 | 0 | 97875 | 97875 | 86 | 99330 | 0 | 0.00 | 113 | 0 | 99330 | 1.0 | 247 | 98 | 0.8 | 0.38 | 111 |
| 8 | 0 | 97598 | 97598 | 84 | 97020 | 0 | 0.00 | 113 | 0 | 97020 | 1.0 | 280 | 98 | 1.0 | 0.33 | 144 |
| 9 | 0 | 97327 | 97327 | 82 | 94710 | 0 | 0.00 | 113 | 0 | 94710 | 1.0 | 312 | 97 | 1.3 | 0.29 | 181 |
| 10 | 0 | 97063 | 97063 | 80 | 92400 | 0 | 0.00 | 113 | 0 | 92400 | 1.0 | 343 | 97 | 1.5 | 0.25 | 219 |
| 20 | 0 | 94489 | 94489 | 78 | 90090 | 0 | 0.00 | 113 | 0 | 90090 | 1.0 | 650 | 94 | 6.1 | 0.22 | 351 |
| 30 | 1 | 91981 | 91981 | 76 | 87780 | 0 | 0.00 | 113 | 0 | 87780 | 1.0 | 957 | 92 | 14 | 0.19 | 611 |
| 40 | 1 | 89539 | 89539 | 74 | 85470 | 0 | 0.00 | 113 | 0 | 85470 | 1.0 | 1264 | 90 | 25 | 0.16 | 1014 |
| 50 | 1 | 87163 | 87163 | 72 | 83160 | 0 | 0.00 | 113 | 0 | 83160 | 1.0 | 1571 | 87 | 38 | 0.14 | 1560 |
| 60 | 1 | 84853 | 84853 | 70 | 80850 | 0 | 0.00 | 113 | 0 | 80850 | 1.0 | 1878 | 85 | 55 | 0.12 | 2244 |
| 70 | 1 | 82609 | 82609 | 68 | 78540 | 0 | 0.00 | 113 | 0 | 78540 | 1.0 | 2185 | 83 | 75 | 0.11 | 3052 |
| 80 | 1 | 80431 | 80431 | 66 | 76230 | 0 | 0.00 | 113 | 0 | 76230 | 0.9 | 2491 | 80 | 98 | 0.09 | 3967 |
| 90 | 2 | 78319 | 78319 | 64 | 73920 | 0 | 0.00 | 113 | 0 | 73920 | 0.9 | 2797 | 78 | 123 | 0.08 | 4971 |
| 100 | 2 | 76273 | 76273 | 62 | 71610 | 0 | 0.00 | 113 | 0 | 71610 | 0.9 | 3100 | 76 | 151 | 0.07 | 6043 |
| 125 | 2 | 71323 | 71323 | 60 | 69300 | 0 | 0.00 | 113 | 0 | 69300 | 1.0 | 3856 | 71 | 244 | 0.06 | 7552 |
| 150 | 3 | 66538 | 66538 | 58 | 66990 | 0 | 0.00 | 113 | 0 | 66990 | 1.0 | 4638 | 67 | 365 | 0.05 | 9510 |
| 175 | 3 | 61918 | 61918 | 56 | 64680 | 0 | 0.00 | 113 | 0 | 64680 | 1.0 | 5449 | 62 | 515 | 0.05 | 11916 |
| 200 | 3 | 57463 | 57463 | 54 | 62370 | 0 | 0.00 | 113 | 0 | 62370 | 1.1 | 6290 | 57 | 699 | 0.04 | 14756 |
| 225 | 4 | 53173 | 53173 | 52 | 60060 | 0 | 0.00 | | 0 | 60060 | 1.1 | 7164 | 53 | 921 | 0.04 | 18011 |
| 250 | 4 | 49048 | 49048 | 50 | 57750 | 0 | 0.00 | | 0 | 57750 | 1.2 | 8073 | 49 | 1185 | 0.03 | 21656 |
| 275 | 5 | 45088 | 45088 | 48 | 55440 | 0 | 0.00 | | 0 | 55440 | 1.2 | 9021 | 45 | 1497 | 0.03 | 25662 |
| 300 | 5 | 41293 | 41293 | 46 | 53130 | 0 | 0.00 | | 0 | 53130 | 1.3 | 10010 | 41 | 1864 | 0.02 | 30003 |
| 325 | 5 | 37663 | 37663 | 44 | 50820 | 0 | 0.00 | | 0 | 50820 | 1.3 | 11046 | 38 | 2295 | 0.02 | 34650 |
| 350 | 6 | 34198 | 34198 | 42 | 48510 | 0 | 0.00 | | 0 | 48510 | 1.4 | 12132 | 34 | 2798 | 0.02 | 39580 |
| 375 | 6 | 30898 | 30898 | 40 | 46200 | 0 | 0.00 | | 0 | 46200 | 1.5 | 13274 | 31 | 3385 | 0.02 | 44771 |
| 400 | 7 | 27763 | 27763 | 38 | 43890 | 0 | 0.00 | | 0 | 43890 | 1.6 | 14478 | 28 | 4072 | 0.01 | 50202 |
| 425 | 7 | 24793 | 24793 | 36 | 41580 | 0 | 0.00 | | 0 | 41580 | 1.7 | 15751 | 25 | 4877 | 0.01 | 55862 |
| 450 | 8 | 21988 | 21988 | 34 | 39270 | 0 | 0.00 | | 0 | 39270 | 1.8 | 17101 | 22 | 5823 | 0.01 | 61740 |
| 475 | 8 | 19348 | 19348 | 32 | 36960 | 0 | 0.00 | | 0 | 36960 | 1.9 | 18538 | 19 | 6939 | 0.01 | 67835 |
| 500 | 8 | 16873 | 16873 | 30 | 34650 | 0 | 0.00 | | 0 | 34650 | 2.1 | 20076 | 17 | 8266 | 0.01 | 74151 |
| 525 | 9 | 14563 | 14563 | 28 | 32340 | 0 | 0.00 | | 0 | 32340 | 2.2 | 21729 | 15 | 9854 | 0.01 | 80703 |
| 550 | 9 | 12418 | 12418 | 26 | 30030 | 0 | 0.00 | | 0 | 30030 | 2.4 | 23517 | 12 | 11778 | 0.01 | 87514 |
| | | | | | | | | | | | | alt. | | | miles | 152 |

TABLE 2

Dual Fuel Space Plane Simulation

| 1 Time (sec) | 2 Time (min) | 3 mass (lb) | 4 H$_2$ + O$_2$ 0.6 60 lb/sec | 5 % H$_2$ thst | 6 H$_2$/thst 360 | 7 HC + O$_2$ 0.4 228 lb/sec | 8 A/fac 3.3 0.96 | 9 % O$_2$ | 10 HC/thst 225 250 | 11 Tot/thst H$_2$ + HC | 12 Acc xg | 13 Vel ft/sec | 14 % mass | 77% 6O$_2$ 192 15 d. dist * 1000 | 23% C$_4$H$_8$ = 56 16 fact 0.87 | 4CO$_2$ = 4H$_2$O 248 17 Height * 1000 |
|---|---|---|---|---|---|---|---|---|---|---|---|---|---|---|---|---|
| 0 | 0 | 100000 | 60000 | 100 | 21600 | 40000 | 3.30 | 33 | 169290 | 190890 | 1.9 | 0 | 100 | 0 | 1 | 0 |
| 1 | 0 | 99712 | 59940 | 100 | 21600 | 39772 | 3.15 | 37 | 161395 | 182995 | 1.8 | 61 | 100 | 0.0 | 0.870 | 0 |
| 2 | 0 | 99424 | 59880 | 100 | 21600 | 39544 | 3.01 | 42 | 154163 | 175763 | 1.8 | 121 | 99 | 0.1 | 0.757 | 0 |
| 3 | 0 | 99136 | 59820 | 100 | 21600 | 39316 | 2.88 | 45 | 147525 | 169125 | 1.7 | 177 | 99 | 0.2 | 0.659 | 0 |
| 4 | 0 | 98848 | 59760 | 100 | 21600 | 39088 | 2.76 | 49 | 141421 | 163021 | 1.6 | 232 | 99 | 0.4 | 0.573 | 1 |
| 5 | 0 | 98560 | 59700 | 100 | 21600 | 38860 | 2.65 | 52 | 135800 | 157400 | 1.6 | 286 | 99 | 0.6 | 0.498 | 1 |
| 6 | 0 | 98272 | 59640 | 100 | 21600 | 38632 | 2.55 | 55 | 130614 | 152214 | 1.5 | 337 | 98 | 0.9 | 0.434 | 1 |
| 7 | 0 | 97984 | 59580 | 100 | 21600 | 38404 | 2.45 | 58 | 125821 | 147421 | 1.5 | 387 | 98 | 1.2 | 0.377 | 2 |
| 8 | 0 | 97696 | 59520 | 100 | 21600 | 38176 | 2.37 | 60 | 121386 | 142986 | 1.5 | 435 | 98 | 1.5 | 0.328 | 2 |
| 9 | 0 | 97408 | 59460 | 100 | 21600 | 37948 | 2.29 | 62 | 117275 | 138875 | 1.4 | 482 | 97 | 1.9 | 0.286 | 3 |
| 10 | 0 | 97120 | 59400 | 100 | 21600 | 37720 | 2.21 | 65 | 113460 | 135060 | 1.4 | 528 | 97 | 2.2 | 0.248 | 3 |
| 20 | 0 | 94240 | 58800 | 100 | 21600 | 35440 | 2.14 | 67 | 109914 | 131514 | 1.4 | 976 | 94 | 9.0 | 0.216 | 5 |
| 30 | 1 | 91360 | 58200 | 100 | 21600 | 33160 | 2.08 | 69 | 106614 | 128214 | 1.4 | 1425 | 91 | 20 | 0.188 | 9 |
| 40 | 1 | 88780 | 57900 | 50 | 10800 | 30880 | 2.02 | 70 | 103540 | 114340 | 1.3 | 1877 | 89 | 33 | 0.164 | 14 |
| 50 | 1 | 86200 | 57600 | 50 | 10800 | 28600 | 1.96 | 72 | 100672 | 111472 | 1.3 | 2292 | 86 | 52 | 0.142 | 22 |
| 60 | 1 | 83620 | 57300 | 50 | 10800 | 26320 | 1.91 | 73 | 97993 | 108793 | 1.3 | 2708 | 84 | 75 | 0.124 | 31 |
| 70 | 1 | 81040 | 57000 | 50 | 10800 | 24040 | 1.86 | 75 | 95489 | 106289 | 1.3 | 3127 | 81 | 103 | 0.108 | 42 |
| 80 | 1 | 78460 | 56700 | 50 | 10800 | 21760 | 1.82 | 76 | 93145 | 103945 | 1.3 | 3550 | 78 | 137 | 0.094 | 55 |
| 90 | 2 | 75880 | 56400 | 50 | 10800 | 19480 | 1.77 | 77 | 90949 | 101749 | 1.3 | 3976 | 76 | 175 | 0.082 | 69 |

TABLE 2-continued

Dual Fuel Space Plane Simulation

| 1 Time (sec) | 2 Time (min) | 3 mass (lb) | 4 H$_2$ + O$_2$ 0.6 60 lb/sec | 5 % H$_2$ | 6 H$_2$/thst 360 | 7 HC + O$_2$ 0.4 228 lb/sec | 8 A/fac 3.3 0.96 | 9 % O$_2$ | 10 HC/thst 225 250 | 11 Tot/thst H$_2$ + HC | 12 Acc xg | 13 Vel ft/sec | 77% 6O$_2$ = 192 14 % mass | 23% C$_4$H$_8$ = 56 15 d. dist * 1000 | 4CO$_2$ = 16 fact 0.87 | 4H$_2$O 248 17 Height * 1000 |
|---|---|---|---|---|---|---|---|---|---|---|---|---|---|---|---|---|
| 100 | 2 | 73300 | 56100 | 50 | 10800 | 17200 | 1.73 | 79 | 88890 | 99690 | 1.4 | 4408 | 73 | 219 | 0.071 | 85 |
| 125 | 2 | 66850 | 55350 | 50 | 10800 | 11500 | 1.70 | 80 | 86956 | 97756 | 1.5 | 5503 | 67 | 368 | 0.062 | 108 |
| 150 | 3 | 60400 | 54600 | 50 | 10800 | 5800 | 1.66 | 81 | 85140 | 95940 | 1.6 | 6680 | 60 | 575 | 0.054 | 139 |
| 175 | 3 | 53950 | 53850 | 50 | 10800 | 100 | 1.63 | 82 | 83432 | 94232 | 1.7 | 7959 | 54 | 861 | 0.047 | 179 |
| 200 | 3 | 52350 | 52350 | 100 | 21600 | 0 | 0.00 |  | 0 | 21600 | 0.4 | 9365 | 52 | 266 | 0.041 | 190 |
| 230 | 4 | 50550 | 50550 | 100 | 21600 | 0 | 0.00 |  | 0 | 21600 | 0.4 | 9763 | 51 | 364 | 0.035 | 202 |
| 260 | 4 | 48750 | 48750 | 100 | 21600 | 0 | 0.00 |  | 0 | 21600 | 0.4 | 10176 | 49 | 482 | 0.031 | 217 |
| 290 | 5 | 46950 | 46950 | 100 | 21600 | 0 | 0.00 |  | 0 | 21600 | 0.5 | 10604 | 47 | 623 | 0.027 | 234 |
| 320 | 5 | 45150 | 45150 | 100 | 21600 | 0 | 0.00 |  | 0 | 21600 | 0.5 | 11049 | 45 | 789 | 0.023 | 252 |
| 350 | 6 | 43350 | 43350 | 100 | 21600 | 0 | 0.00 |  | 0 | 21600 | 0.5 | 11511 | 43 | 983 | 0.020 | 272 |
| 380 | 6 | 41550 | 41550 | 100 | 21600 | 0 | 0.00 |  | 0 | 21600 | 0.5 | 11992 | 42 | 1209 | 0.018 | 293 |
| 416 | 7 | 39390 | 39390 | 100 | 21600 | 0 | 0.00 |  | 0 | 21600 | 0.5 | 12595 | 39 | 1528 | 0.015 | 317 |
| 452 | 8 | 37230 | 37230 | 100 | 21600 | 0 | 0.00 |  | 0 | 21600 | 0.6 | 13230 | 37 | 1908 | 0.013 | 342 |
| 488 | 8 | 35070 | 35070 | 100 | 21600 | 0 | 0.00 |  | 0 | 21600 | 0.6 | 13903 | 35 | 2361 | 0.012 | 370 |
| 524 | 9 | 32910 | 32910 | 100 | 21600 | 0 | 0.00 |  | 0 | 21600 | 0.7 | 14617 | 33 | 2901 | 0.010 | 399 |
| 560 | 9 | 30750 | 30750 | 100 | 21600 | 0 | 0.00 |  | 0 | 21600 | 0.7 | 15378 | 31 | 3547 | 0.009 | 430 |
| 596 | 10 | 28698 | 28698 | 95 | 20520 | 0 | 0.00 |  | 0 | 20520 | 0.7 | 16192 | 29 | 4089 | 0.008 | 461 |
| 632 | 11 | 26754 | 26754 | 90 | 19440 | 0 | 0.00 |  | 0 | 19440 | 0.7 | 17021 | 27 | 4673 | 0.007 | 493 |
| 668 | 11 | 24918 | 24918 | 85 | 18360 | 0 | 0.00 |  | 0 | 18360 | 0.7 | 17863 | 25 | 5293 | 0.006 | 523 |
| 704 | 12 | 23190 | 23190 | 80 | 17280 | 0 | 0.00 |  | 0 | 17280 | 0.7 | 18717 | 23 | 5946 | 0.005 | 553 |
| 740 | 12 | 21570 | 21570 | 75 | 16200 | 0 | 0.00 |  | 0 | 16200 | 0.8 | 19581 | 22 | 6621 | 0.004 | 582 |
| 776 | 13 | 20058 | 20058 | 70 | 15120 | 0 | 0.00 |  | 0 | 15120 | 0.8 | 20452 | 20 | 7308 | 0.004 | 610 |
| 812 | 14 | 18654 | 18654 | 65 | 14040 | 0 | 0.00 |  | 0 | 14040 | 0.8 | 21325 | 19 | 7990 | 0.003 | 636 |
| 848 | 14 | 17358 | 17358 | 60 | 12960 | 0 | 0.00 |  | 0 | 12960 | 0.7 | 22198 | 17 | 8644 | 0.003 | 661 |
| 884 | 15 | 16170 | 16170 | 55 | 11880 | 0 | 0.00 |  | 0 | 11880 | 0.7 | 23063 | 16 | 9244 | 0.003 | 684 |
| 920 | 15 | 15090 | 15090 | 50 | 10800 | 0 | 0.00 |  | 0 | 10800 | 0.7 | 23915 | 15 | 9753 | 0.002 | 706 |
| 950 | 16 | 14280 | 14280 | 45 | 9720 | 0 | 0.00 |  | 0 | 9720 | 0.7 | 24606 | 14 | 9890 | 0.002 | 725 |
|  |  |  |  |  |  |  |  |  |  |  |  | alt. |  | miles |  | 126 |

Figure 25:
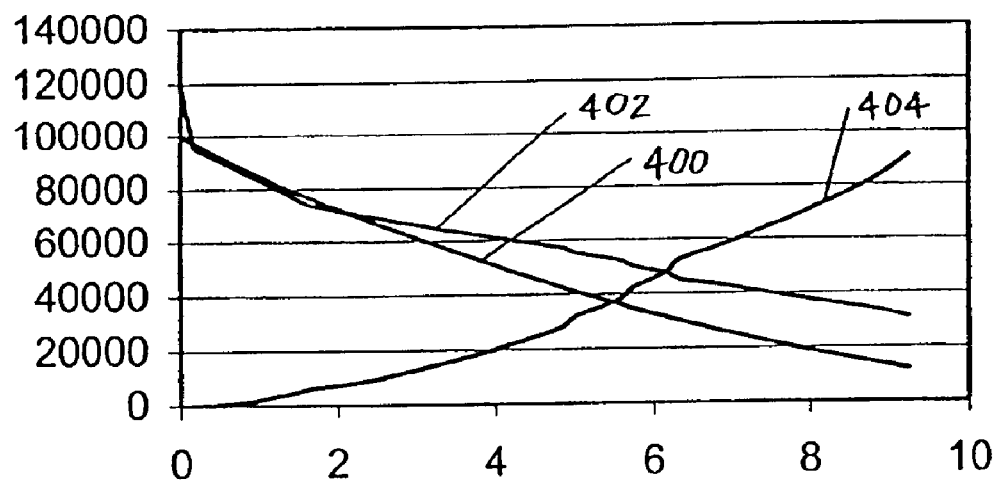
FIG. 25 shows a graphical representation of the performance of the space plane described in Table 1.

FIG. 25 is a graphical representation of the performance of the space plane of Table 1. The x-axis is flight time in minutes, and the y-axis is the estimated performance of the space plane, with mass and thrust in lbs. and height in ft. The parameters graphed are the mass 400, thrust 402 contributed by the H2 and O2 fuel, and height 404 attained by the space plane.

Figure 26:
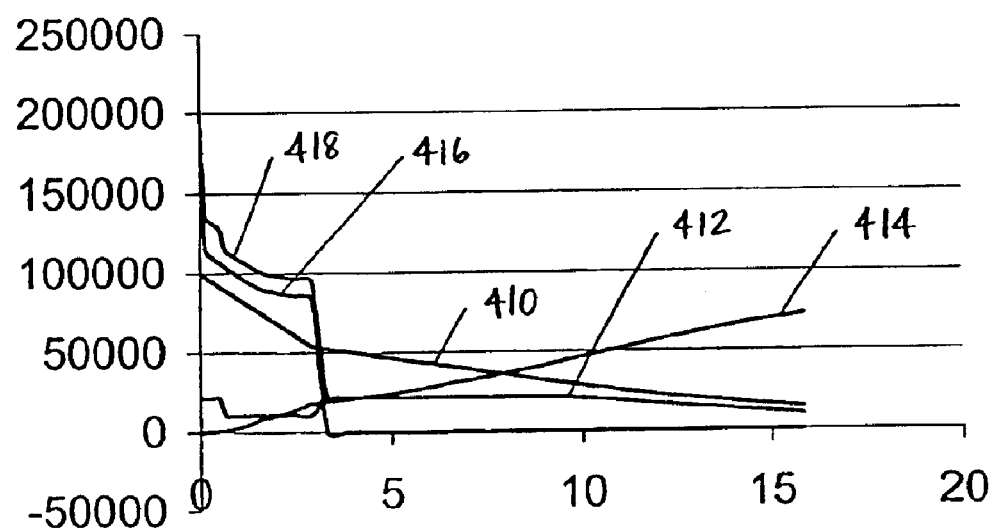
FIG. 26 shows a graphical representation of the performance of the space plane described in Table 2.

Similarly, FIG. 26 is a graphical representation of the performance of the space plane of Table 2. The x-axis is flight time in minutes and the y-axis is the estimated performance of the space plane, with mass and thrust in lbs. and height in ft. The parameters graphed are the mass 410, thrust 412 contributed by the H2 and O2 fuel, height 414 attained by the space plane, and the additional parameters of hydrocarbon thrust 416 and total thrust 418.

By combining and optimizing the embodiments of the invention described thus far, it is believed that significant gains in the payload carrying capacity of the space plane can be achieved.

Following are additional embodiments of the invention which are directed primarily at inhibiting separation of the boundary layer. In this aspect of the invention, boundary layer separation may be prevented or inhibited by stimulating, rejuvenating, or otherwise adding to and maintaining the energy in the boundary layer.

Figure 10:
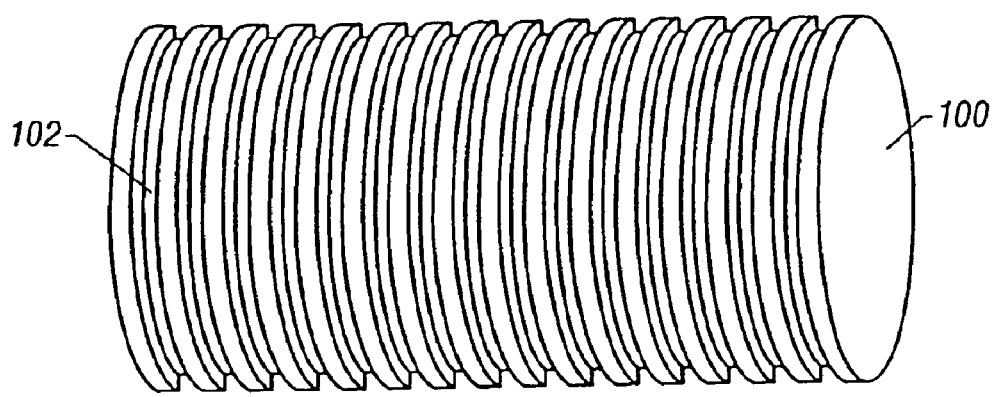
FIG. 10 is a perspective view of a turbine having grooves.

Referring again to FIG. 7, although in this embodiment the turbine 72 is used primarily to induce the vortex 74, in other embodiments the turbine 72 may be used to prevent and/or inhibit separation of the boundary layer. In one embodiment, referring to FIG. 10, a rotatable turbine 100 has circumferential grooves 102 formed on the outer circumference of the turbine 100. Alternatively, a preformed cover layer having grooves 102 may be adhered or otherwise attached to the turbine 100. As mentioned above, boundary layer separation occurs when the boundary layer runs out of energy and can no longer hold the plume against the reaction plane. The grooves 102 help to inhibit boundary layer separation by acting as "micro-funnels" that re-energize the boundary layer and help prevent separation as the turbine 100 rotates. The distribution of the grooves 102 may be close together, for example, one groove's width apart as shown, or closer, or the grooves 102 may be several grooves apart. In some embodiments, the shape of the grooves 102 may be rectangular as depicted. In other embodiments, however, depending on the application, triangular or rounded grooves 102 may be more effective.

Figure 11:
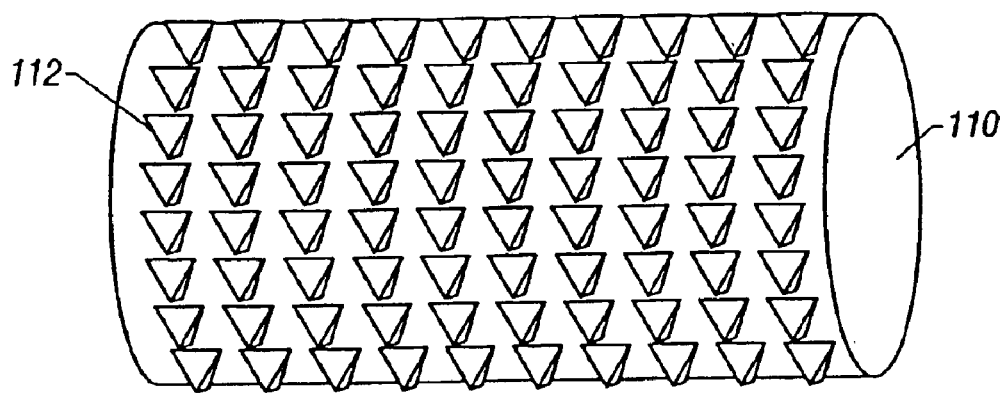
FIG. 11 is a perspective view of a turbine having strings of Wheeler vortex generators.

Alternatively, the turbine may have strings of "Wheeler vortex generators" to help prevent and/or inhibit boundary layer separation. In this embodiment, referring to FIG. 11, a rotatable turbine 110 has circumferential strings of Wheeler vortex generators 112 along the outer circumference of the turbine 110. The vortex generators 112 may be attached to the turbine 110 by adhesive or by other suitable attachment means. In some embodiments, a pre-formed adhesive-backed sheet of vortex generators 112 may be applied to the outer circumference of the turbine 110. In other embodiments, the vortex generators 112 may be stamped into the turbine 110 or molded with a composite material on the turbine 110.

In operation, the vortex generators 112, as is known to those of ordinary skill in the art, and as the name implies, generate precisely shaped and controlled vortices that add rotational energy to the boundary layer and help prevent it from separating. The size and/or shape of the vortices may be controlled by proper selection of the size of the Wheeler vortex generators 112. In a preferred embodiment, the Wheeler vortex generators 112 are pointed in a direction opposite the direction of rotation of the turbine 110 and are arranged in overlapping cascades. This arrangement serves to reinforce the vortices by adding rotational energy to the vortices as they move along the string of vortex generators 112. As in the case of the grooves, the distribution of the strings of Wheeler vortex generators 112 may be close together, spaced apart, or chosen to suit the particular boundary layer control needs of the application.

Although not shown here, in some embodiments, a turbine may have a combination of grooves 102 and strings of Wheeler vortex generators 112.

Figure 12:
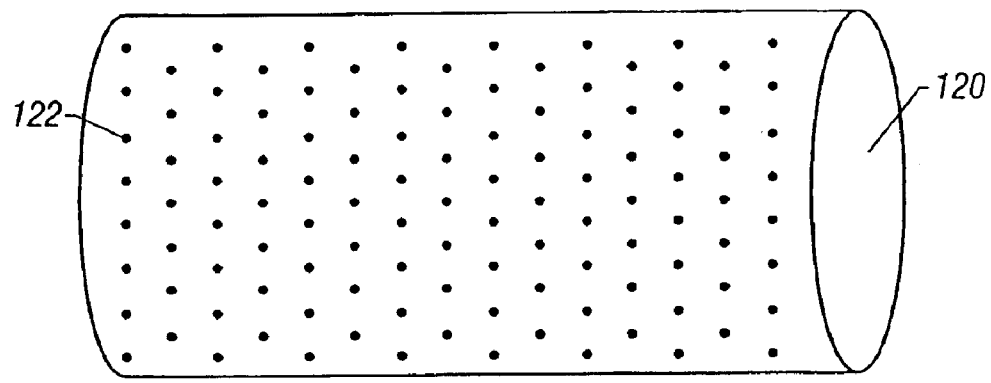
FIG. 12 is a perspective side view of a turbine having dimples.

In another embodiments, referring to FIG. 12, a rotatable turbine 120 has dimples 122 on an outer circumferential surface of the turbine 120. As the plume passes over the turbine 120, the dimples 122 keep the boundary layer behind the turbine 120 from separating away from the turbine 120, thereby reducing drag behind the turbine 120 in much the same way that dimples on a golf ball help to reduce drag on the ball. Because the boundary layer behind the turbine 120 is more stabilized, separation from the reaction plane may be inhibited. The dimples 122 may be arranged in an alternating pattern as shown, or a random pattern, or they may be arranged in other suitable patterns. In a preferred embodiment, the size and depth of the dimples 122 may be about the same as that of a typical golf ball. In other embodiments, however, they may be smaller, larger, deeper, or shallower according to the requirements of the application.

Figure 13:
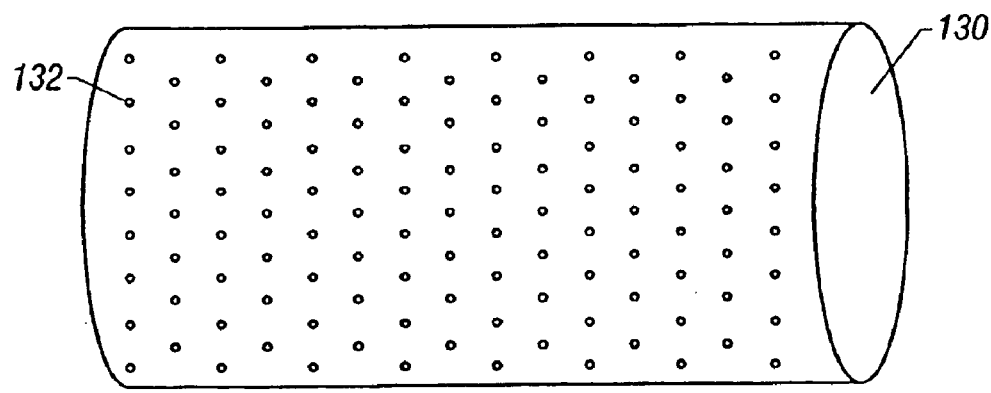
FIG. 13 is a perspective side view of a turbine having perforations.

In yet another embodiment, referring to FIG. 13, a rotatable turbine 130 has perforations 132 in a circumferential surface of the turbine 130. In operation, the perforations 132, like the dimples, help control the boundary layer by reducing drag behind the turbine 130. In a preferred embodiment, the turbine 130 is hollow and resembles a cylindrical canister with holes in the circumferential surface. In this embodiment, the turbine 130 may be driven by venting the turbo exhaust from the turbo pump (not shown) into the perforations 132 at a predetermined angle. In other embodiments, the turbine is solid and the perforations 132 run all the way through the turbine 130 along the circumferential surface. In these embodiments, the turbine 130 may be driven by mechanical or electrical means.

Figure 14:
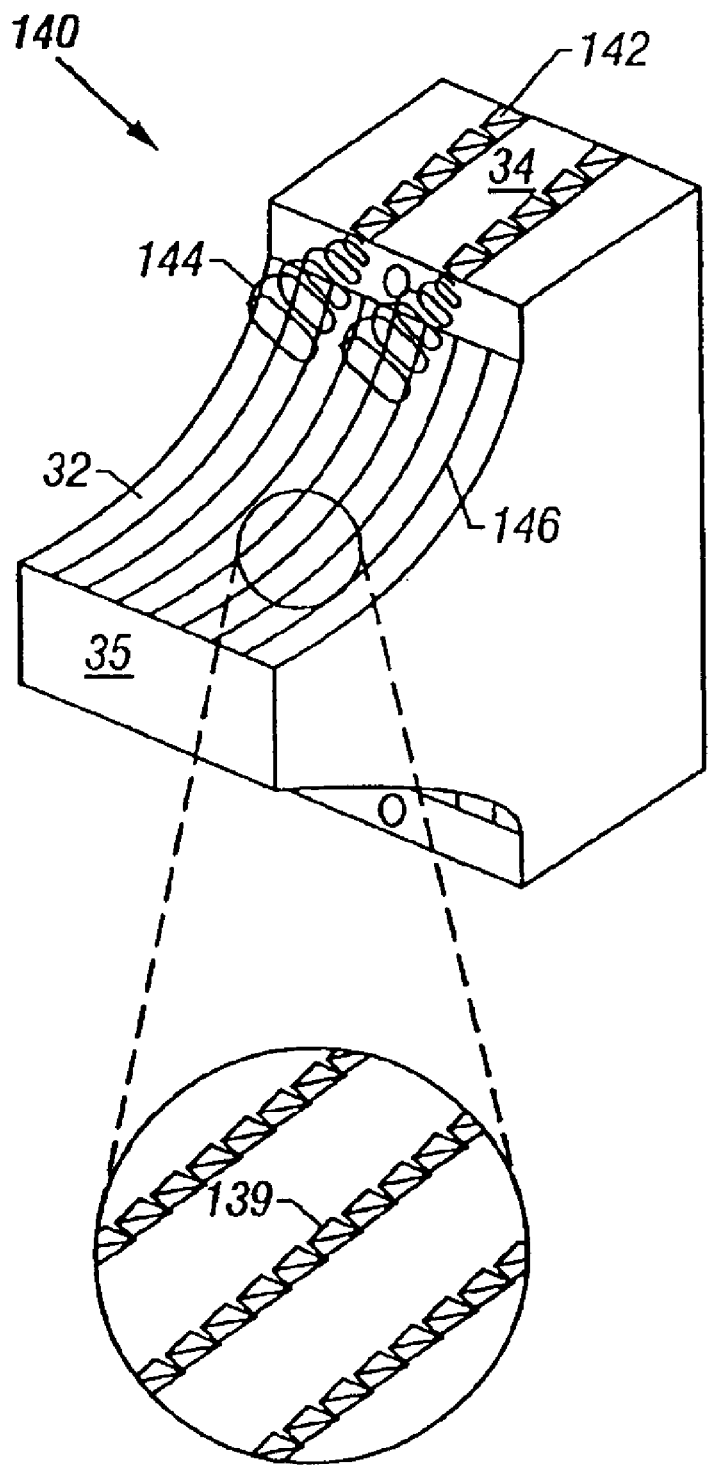
FIG. 14 is a perspective view of a linear aerospike engine incorporating Wheeler vortex generators.

Turning now to FIG. 14, a linear aerospike engine 140 may have Wheeler vortex generators mounted on the reaction plane 32 and/or the leading end 34 to prevent or reduce boundary layer separation. In one embodiment, the engine 140 has strings of cascaded Wheeler vortex generators 142 attached to the leading end 34. In operation, the vortex generators 142 generate vortices 144 that energize to the air passing over the leading end 34, which helps to control the boundary layer over the reaction plane 32 and prevent the boundary layer from separating. In addition, the engine 140 also has strings of cascading Wheeler vortex generators 146 disposed on the reaction plane 32. The vortex generators 146 generate vortices that energize the boundary layer between the reaction plane 32 and the plume.

In a preferred embodiment, the vortex generators 146 are miniature in size and generate microscopic vortices called "vorticity." The rationale for this embodiment is the energy in the boundary layer is carried in microscopic spirals of air that make up the boundary layer. Therefore, the microscopic size of the vorticity allows it to more effectively rejuvenate the spirals of air, thus strengthening the boundary layer.

Although the vortex generators 142 and 146 are shown here to be of different sizes, it is contemplated that both vortex generators 142 and 146 may be of the same size. In addition, both vortex generators 142 and 146 may be used, or one may be used exclusive of the other. The attachment means for the vortex generators 142 and 146 may be the same as the attachment means described in the embodiment of FIG. 11.

Figure 15:
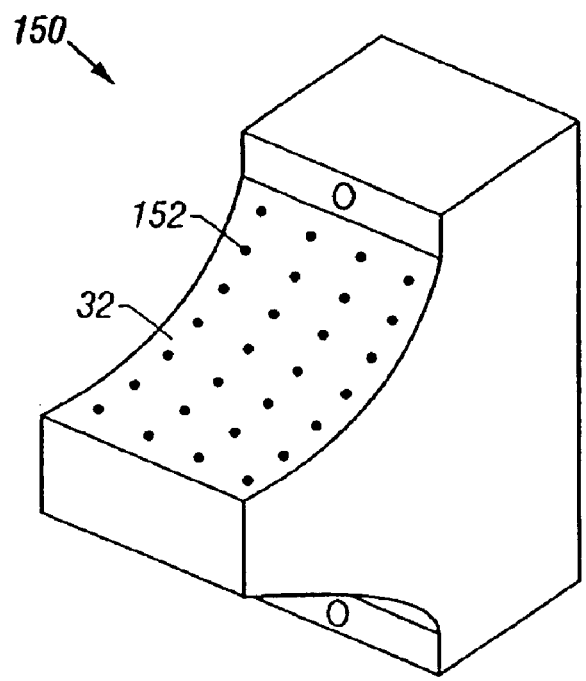
FIG. 15 is a perspective view of a linear aerospike engine having a dimpled reaction plane.

In an alternative embodiment, referring to FIG. 15, an engine 150 may have dimples 152 formed on the reaction plane 32 to inhibit boundary layer separation. The dimples 152 may be formed directly on the reaction plane 32, or they may be on a sheet of preformed dimples that can be adhered to the reaction plane 32. The pattern of distribution of the dimples may be various suitable patterns previously discussed in FIG. 12. In operation, the dimples have the effect of adhering the boundary layer to the reaction plane 32, thus inhibiting boundary layer separation.

Figure 16:
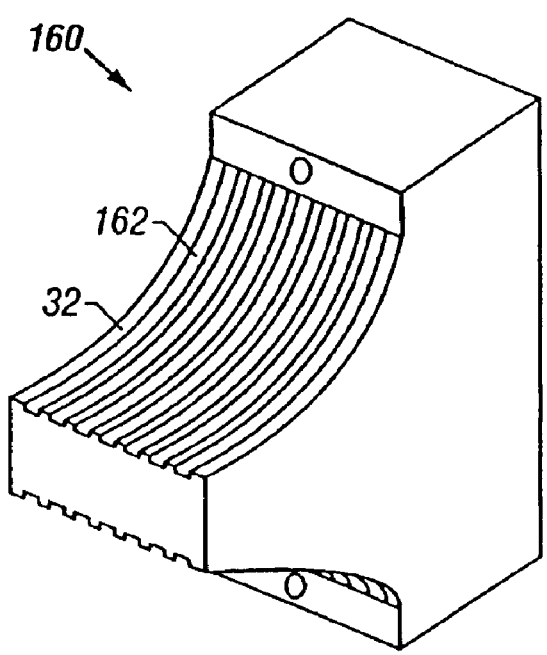
FIG. 16 is a perspective view of a linear aerospike engine having a grooved reaction plane.

In another embodiment, referring to FIG. 16, an engine 160 may have longitudinal grooves 162 formed on, or otherwise adhered to, the reaction plane 32 to inhibit boundary layer separation. The grooves 162 may be of similar shapes and distributions as the grooves of FIG. 10. In operation, the grooves 162 act as micro-funnels that re-energize the boundary layer as the boundary layer travels through grooves 162 and down the reaction plane 32.

In some embodiments, the reaction plane 32 may have a combination (not shown) of the grooves 162 and the vortex generators 146.

In another embodiment, the reaction plane 32 may be coated with a special drag-resistant coating (not shown), for example, Teflon, such that the boundary layer encounters minimal resistance as it travels down the reaction plane 32. This reduction in drag allows the boundary layer to retain energy otherwise spent to overcome the drag, which helps prevent boundary layer separation. Preferably, the Teflon coating is used in conjunction with the grooves 162 to reduce the drag on the boundary layer as it travels through the grooves 162.

Turning now to another aspect of the invention, thrust and engine efficiency may be maintained or increased by selectively adapting the length of the reaction plane.

As previously mentioned, under-expansion of the plume in a bell engine can result in up to a 5% decrease in thrust. By way of illustration, a 92-inch bell nozzle has a plume expansion ratio of 400:1 and renders a specific impulse of 336 seconds, whereas a 52-inch nozzle has an expansion ratio of only 132:1 and renders a specific impulse of 328 seconds. At first glance, it may appear that the 92-inch nozzle incurs a substantial nozzle size and/or weight penalty in order to realize a specific impulse gain of only 8 seconds over the 52-inch nozzle. However, the impact on the orbital payload capacity of the 52-inch nozzle may be profound when one considers that a reduction of, say, 10 seconds from a base specific impulse of 360 seconds reduces a vehicle's orbital payload capacity by 50%, e.g., from 12% down to 11% payload capacity, with 10% attributed to the vehicle itself and, therefore, fixed. By analogy, the payload capacity of a truncated linear aerospike engine may be similarly reduced compared to an engine having a longer reaction plane. Therefore, it is desirable to selectively adjust the length of the reaction plane as the space plane transitions from low to high altitudes to optimize the thrust and/or engine efficiency. Alternatively, each engine in a bank of linear aerospike engines may have a fixed, but different length reaction plane relative to the other engines.

Figure 17B:
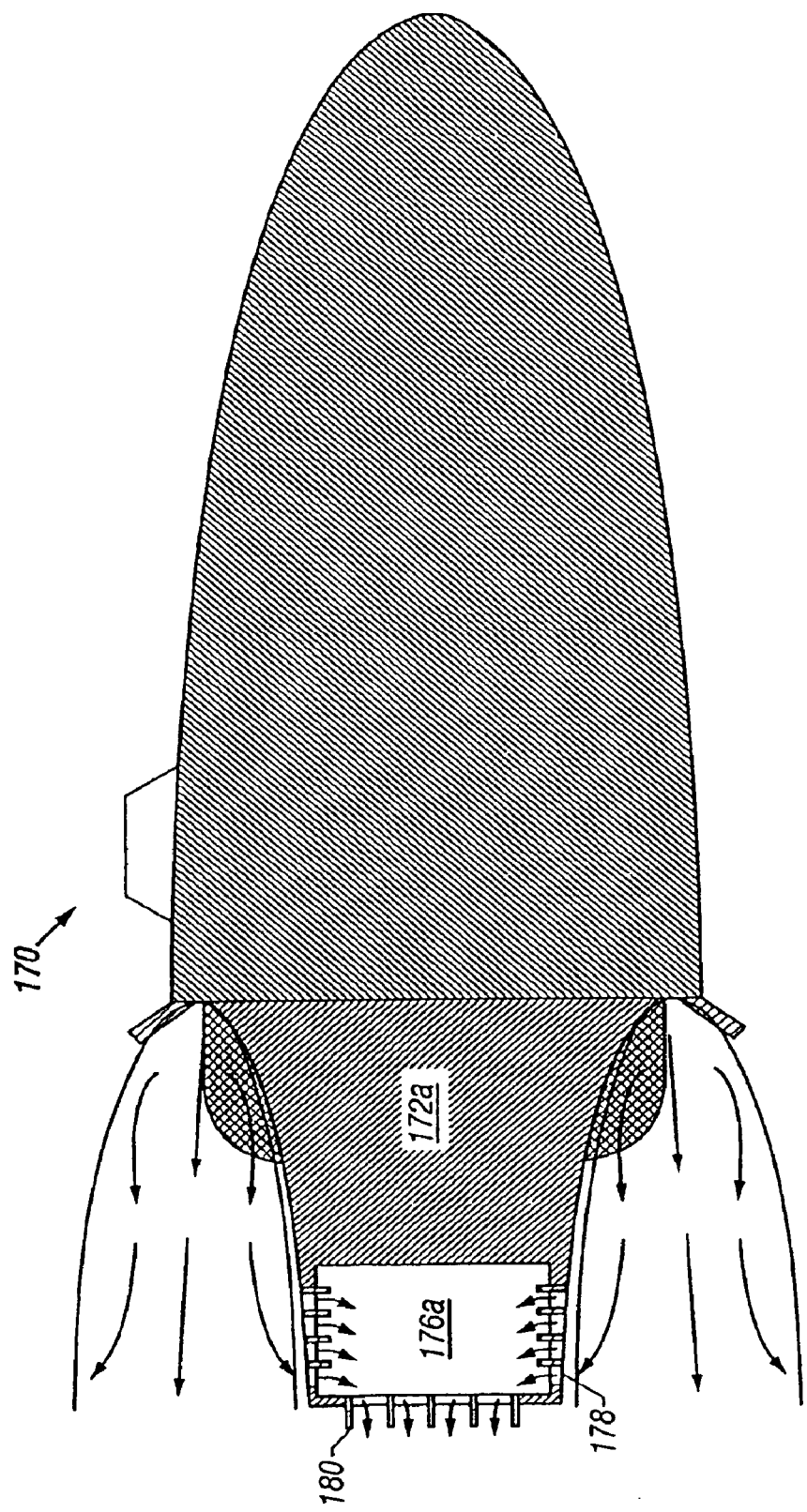

Referring now to FIGS. 17A and 17B, a space plane 170 has a bank of linear aerospike engines 172a–172e. The engines 172a–172e have reaction planes 174a–174e, respectively, each reaction plane having a fixed, but differing length and/or width relative to the other reaction planes. The length of a particular engine's reaction plane is optimized for operation during a particular flight regime. For example, the engine 172a has a long reaction plane 174a that includes a reaction plane extension 176a and is optimized for operation in a high altitude and/or vacuum flight regime where maximum velocity (hence, plume expansion) is required and the potential for boundary layer separation is high. The engines 172b and 172c have intermediate length reaction planes 174b and 174c that include reaction plane extensions 176b and 176c and are optimized for operation in a medium altitude flight regime. The engines 172d and 172e have truncated reaction planes 174d and 174e which are optimized for operation at take-off and in a low altitude flight regime.

In one embodiment, the extensions 176a–176c are hollow and include slits or openings 178 on the curved surfaces and trailing ends of the extensions 176a–176c. The size, shape, orientation, and distribution of the slits or openings 178 are design choices that may be selected as needed to suit a given application. However, it is contemplated that the slits or openings 178 are rectangular in shape and arranged horizontally as shown. In addition, the extensions 176a–176c have covers 180 adjacent the slits or openings 178 that selectively open and close the slits or openings 178. In a some embodiment, the covers 180 are hinged over the slits or openings 178 and swing open and close over the slits or openings 178. (See FIG. 17B.) One or more electric motors (not shown) may be used to swing the covers 180 opened and closed, although the particular means for opening and closing is not critical to the invention. In other embodiments, the covers 180 are not hinged, but are instead attached in such a way so as to selectively slide over the slits or openings 178.

In operation, all of the engines 172a–172e are fired at lift-off in order to obtain maximum net thrust for the space plane 170. However, each of the engines 172a–172e attains maximum thrust and/or engine efficiency only during its designated flight regime. Alternatively, each of the engines 172a–172e may be fired only when the space plane 170 reaches the engine's designated flight regime. The engines 172a–172e may then be shut off when the space plane 170 crosses through the particular flight regime, or the engines 172a–172e may be allowed to continue to operate through the entire flight. In some embodiment, the each of the engines 172a–172e are selectively modulated or otherwise fired at predetermined times and for predetermined durations throughout the flight in accordance with a predeveloped firing strategy to optimize the thrust and/or engine efficiency. In other embodiments, the thrust from each of the engines 172a–172e may be decreased, increased, or otherwise selectively adapted as needed while the space plane 170 is in flight.

Although the engines 172a–172e may all use the same fuel, it is contemplated that the engines 172a–172e use different types of fuels, with the engine 172a using, for example, a $H_2$ fuel and the engines 172d and 172e using a hydrocarbon fuel, e.g., propane. As explained above, the engines having longer reaction planes generally provide more thrust and are more efficient at high altitude, which is also where the space plane needs maximum velocity, hence, thrust. However, there is less atmospheric oxygen available to be aspirated at high altitude relative to low altitude where a hydrocarbon fuel is preferred. The $H_2$ fuel uses on-board tanked $O_2$ and, therefore, does not require atmospheric $O_2$. Also, the $H_2$ fuel generally has a higher specific impulse than hydrocarbon fuel. Therefore, in order to obtain maximum thrust at high altitude, it is generally more desirable to use the $H_2$ fuel. On the other hand, it is contemplated that the engines 172b–172e may use either the $H_2$ fuel or a hydrocarbon fuel.

Figure 1:
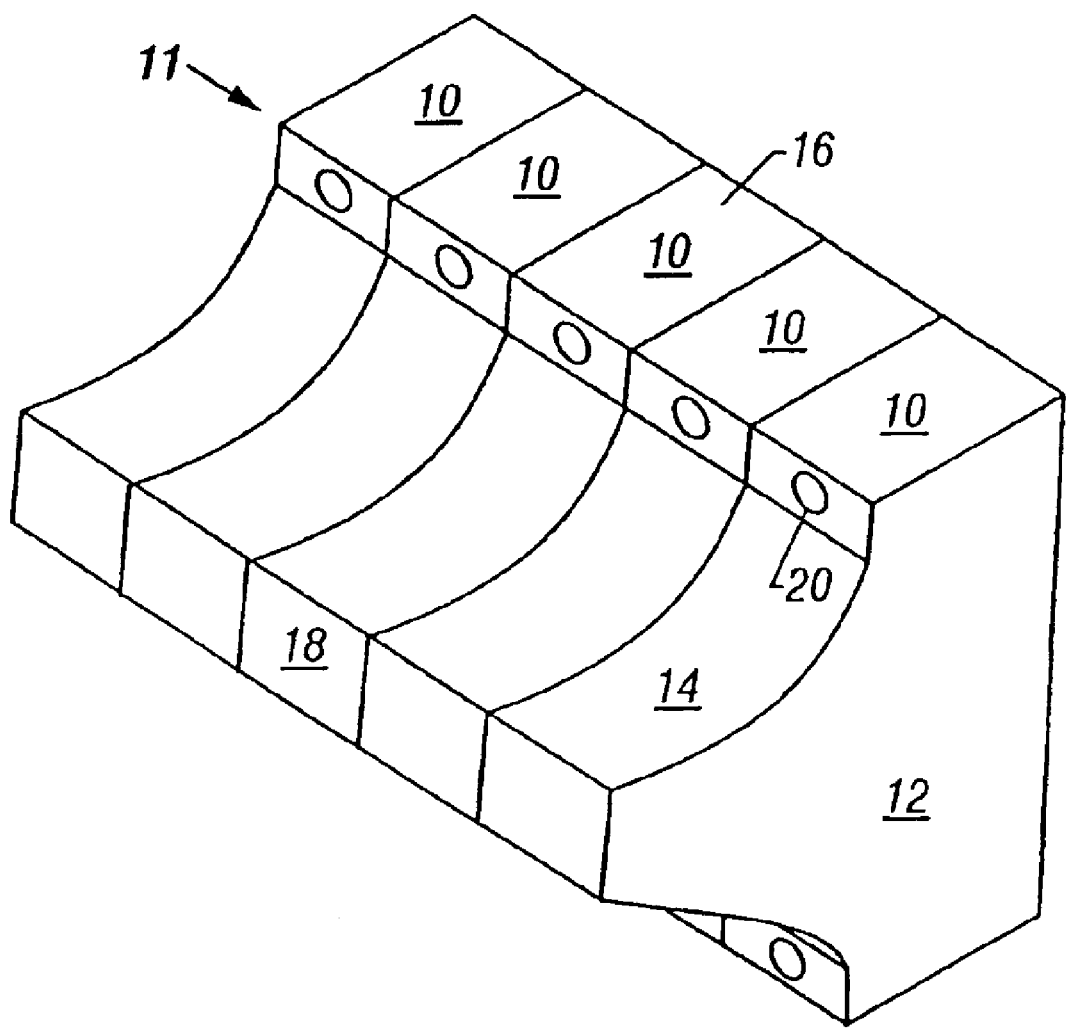
FIG. 1 is a perspective view of a prior art bank of linear aerospike engines.
Figure 2C:
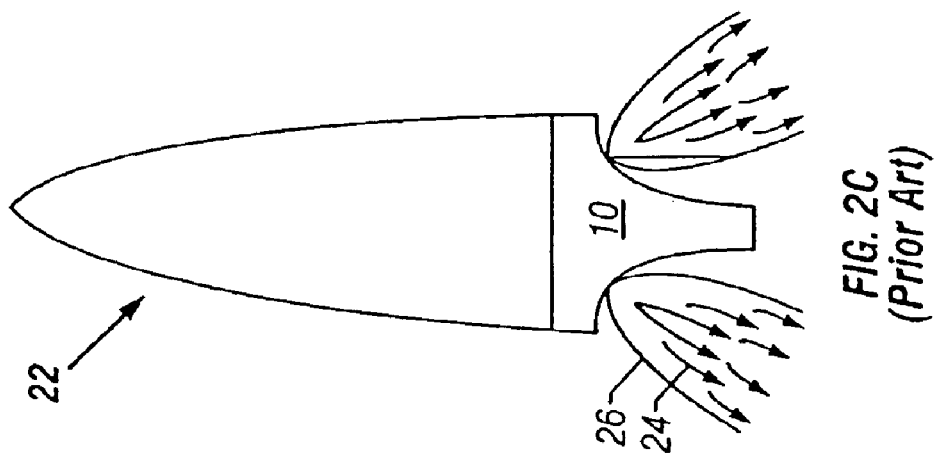
FIGS. 2A–2C are side views of a space plane incorporating the prior art engines of FIG. 1.
Figure 2B:
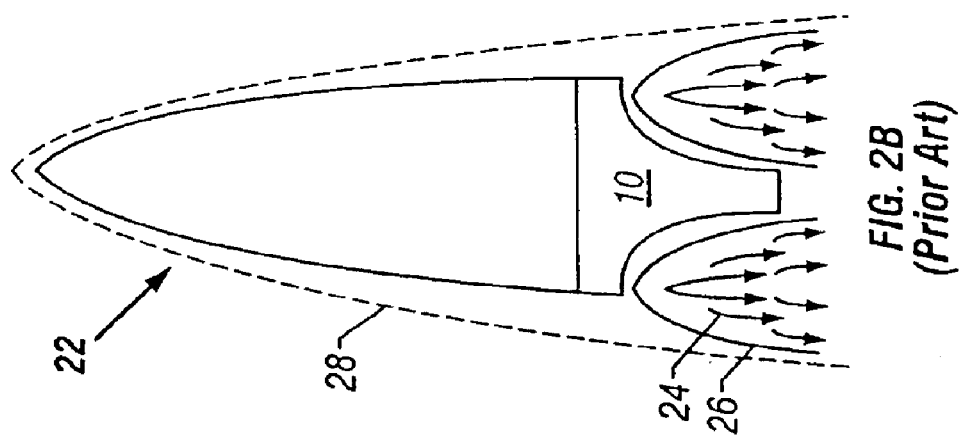
Figure 2A:
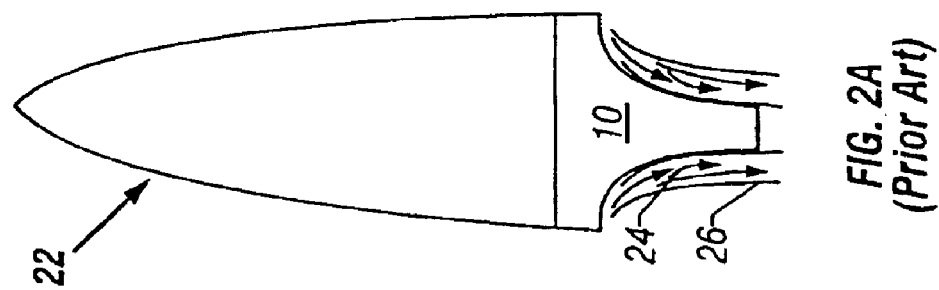

The slits or openings 178 typically remain closed during atmospheric flight and are opened as the space plane 170 approaches or reaches space. The rationale for this is in space there is no atmospheric pressure to resist the expansion of the plume. Consequently, for a prior art linear aerospike engine, the vacuum of space may tend to pull the plume away from the reaction plane, which may result in boundary layer separation and may cause the thrust vectors to diverge or otherwise be out of line with the direction of flight of the space plane (see prior art FIG. 2C). The opened slits or openings 178, however, expose the plume to the vacuum of the hollow extensions 176a–176c, the suction from which removes decelerated boundary layer fluid from the boundary layer, effectively "lubricating" the boundary layer. With the decelerated boundary layer fluid thus removed, the boundary layer is able to adhere to the reaction plane (as shown) despite the pull of the vacuum of space. Moreover, by virtue of the plume being properly adhered to the reaction plane, the thrust vectors may become aligned in the direction of flight, as shown.

It is contemplated that the space plane 170 may implement any of the embodiments described herein to increase pressure on the reaction planes and/or inhibit boundary layer separation. For example, the space plane 170 may also have a spoiler 182, second injectors 184, grooved reaction planes (not shown), and injectors that direct fuel in counter current directions (not shown), the major advantages of which are described above. Also, one adjustable spoiler 182 may be used for the entire bank of engines, or multiple adjustable spoilers 182 of different sizes and shapes may be used. In addition, the space plane 170 may have one or more partitions or fences 186 attached perpendicular to the reaction planes 174a–174e and extending parallel to the longitudinal axes of the reaction planes. The partitions 186 help to confine and focus the plume in order to optimize the thrust from the engines 172a–172e.

Figure 18:
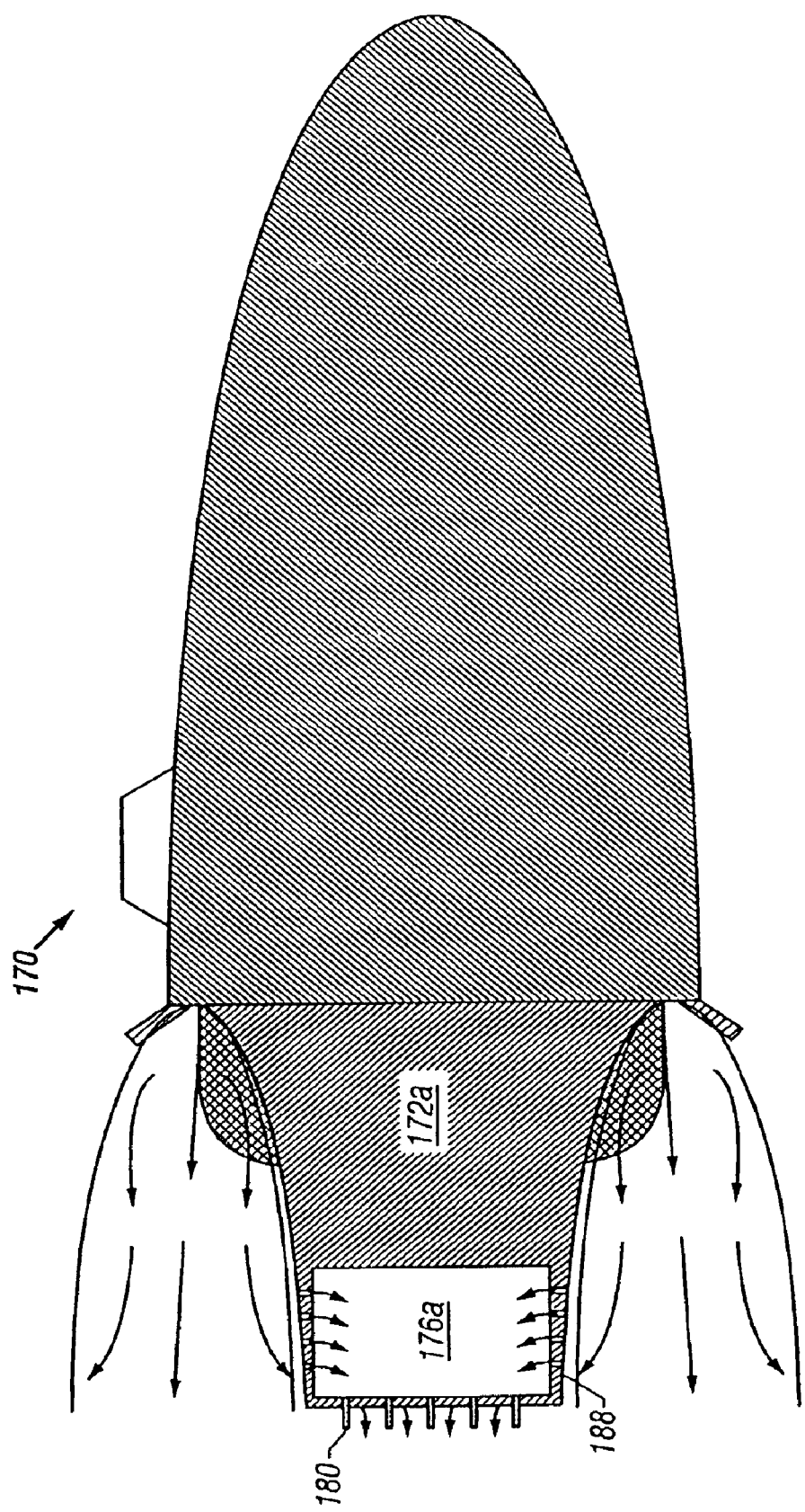
FIG. 18 is a cross-sectional side view of a space plane incorporating a reaction plane extension having perforations.

In a preferred embodiment, referring to FIG. 18, instead of slits on the curved surface of the reaction plane extensions 176a–176c, there may be perforations 188 instead. The perforations perform essentially the same functions as the slits 178 and may be of any size, shape, and distribution to suit the needs of a particular application.

Figure 19:
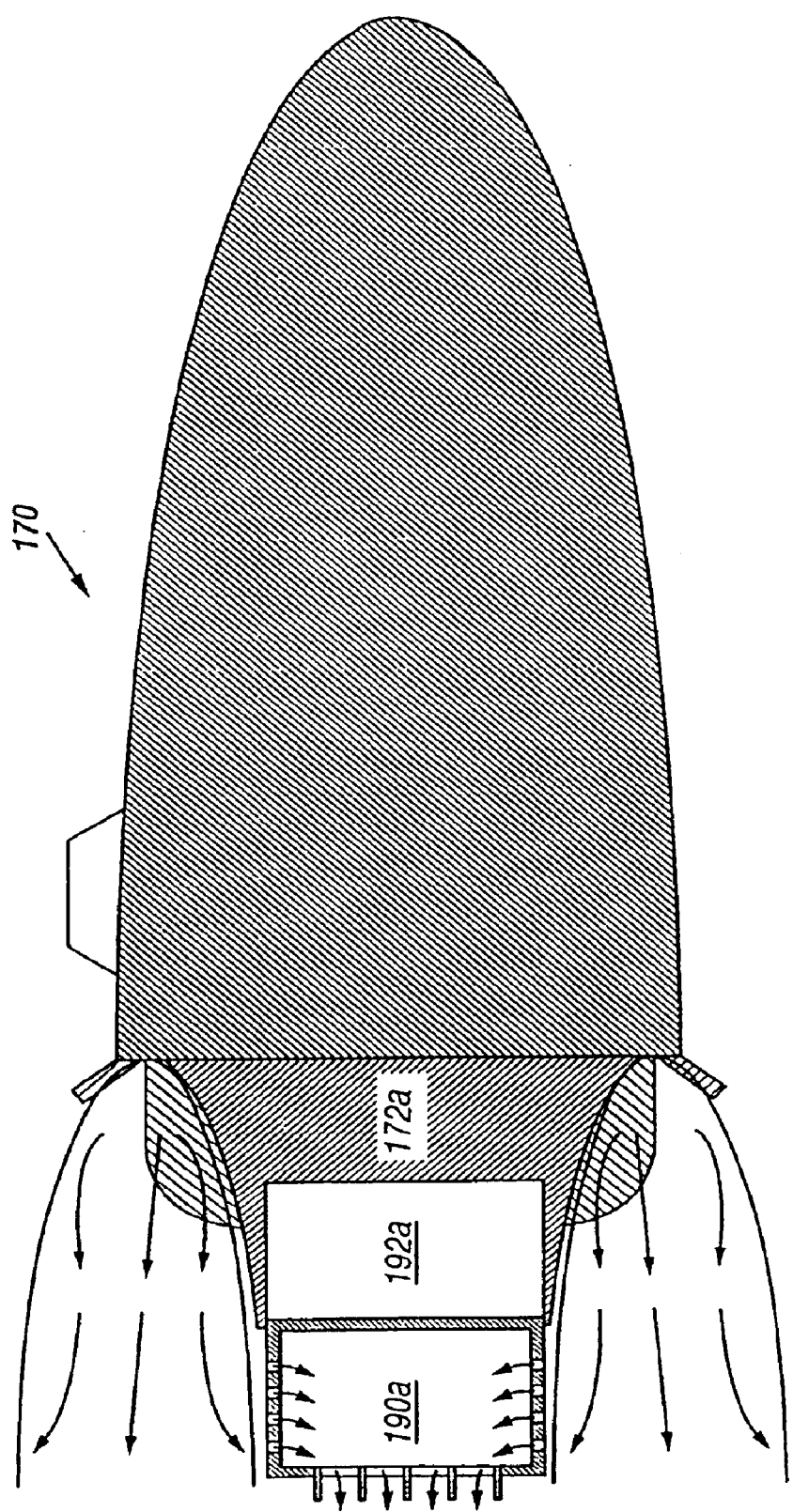
FIG. 19 is a cross-sectional side view of a space plane incorporating a retractable reaction plane extension.

In an alternative embodiment, referring to FIG. 19, instead of having fixed lengths, the engines 172a–172c may have retractable extensions 190a–190c that may be retracted into cavities 192a–192c in the engines 172a–172c. Note that because FIG. 19 is a cross-sectional view, only extension 190a and cavity 192a are visible. The extensions 192a–192c allow the reaction planes of the engines 172a–172c to be selectively lengthened or shortened as needed to maximize the thrust and/or engine efficiency. One advantage of such a design is that all the engines 172a–172e may be operated at essentially the same time, and then the length of the reaction planes 174a–174c may be selectively adjusted in flight for each flight regime. In some embodiments, the extensions 190a–190c are retracted by a hydraulic motor (not shown), or by other suitable means, and are also perforated as shown.

Figure 20:
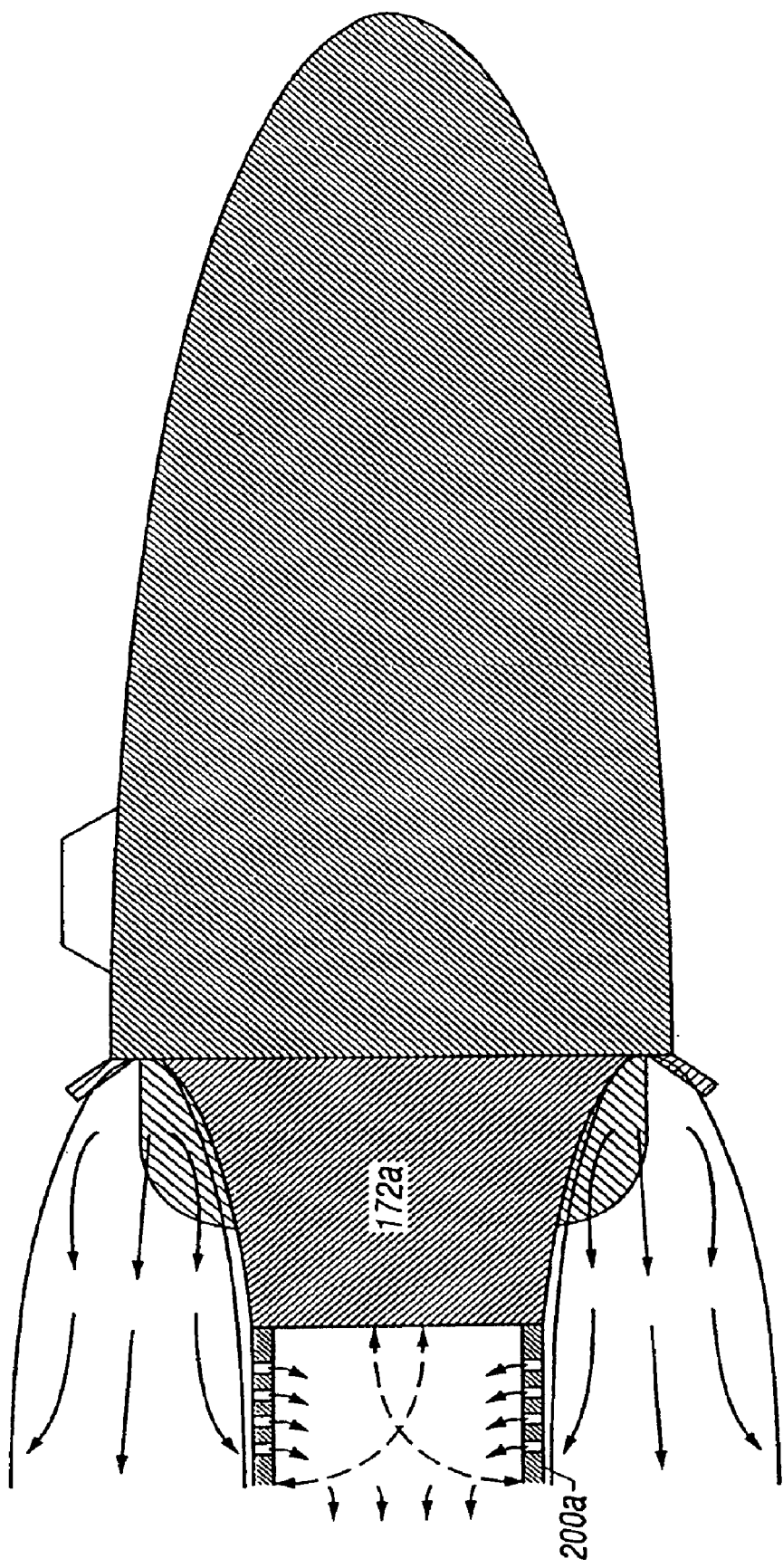
FIG. 20 is a cross-sectional side view of a space plane incorporating foldable reaction plane extensions.

In another embodiment, referring to FIG. 20, the engines 172a–172c may have reaction plane extensions 200a–200c that are selectively foldable instead of retractable. The extensions 200a–200c may be attached to engines 172a–172c by, for example, hinges that allows the extensions 200 to be swung opened or closed at the appropriate time to lengthen or shorten the reaction planes. The means for swinging the extensions 200a–200c opened or closed may be, for example, another hydraulic motor (not shown), or other suitable means. In a preferred embodiment, the extensions 200a–200c may be perforated as shown.

Figure 21A:
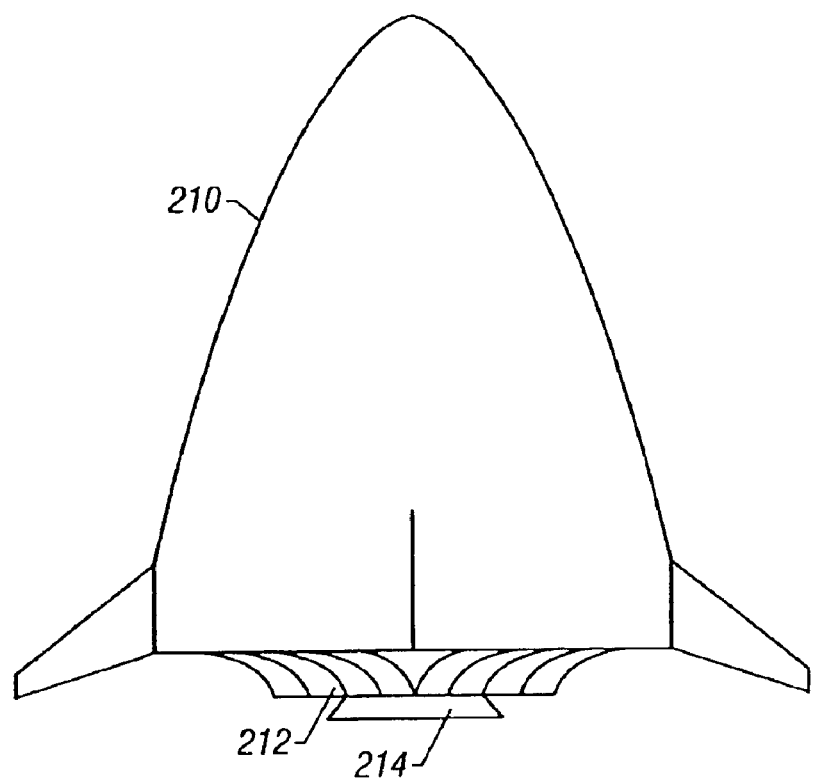
FIGS. 21A and 21B are a side view and a bottom view, respectively, of a space plane having a linear aerospike engine and a bell-shaped nozzle engine.
Figure 21B:
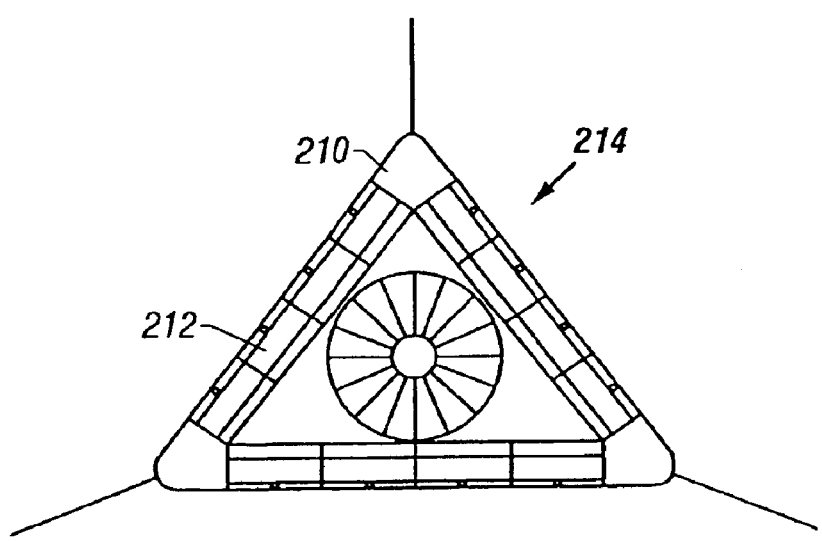

Referring to FIG. 21, in yet another embodiment, a space plane 210 may have both a linear aerospike engine 212 and a bell-shaped nozzle engine 214. The rationale for including the bell-shaped nozzle engine 214 is that it is more efficient than the aerospike engine 212 in outer space. As mentioned before, the thrust vectors of the aerospike engine 212 may become misaligned with the line of flight in space because the vacuum of space tends to pull the plume of the aerospike engine 212 away from the reaction plane. The thrust vectors of the bell-shaped nozzle engine 214, however, are always aligned with the line of flight because the expansion of the plume is confined by the bell-shaped nozzle.

In operation, only the linear aerospike engine 212 is fired at take-off and propels the space plane 210 into outer space. The bell-shaped nozzle engine 214 is then fired to propel the space plane 210 through space. Alternatively, the bell-shaped nozzle engine 214 may also be fired at take-off, but only at, say, 50% until the space plane 210 reaches outer space. Once in outer space, the engine 214 may then be given full throttle.

Figure 22:
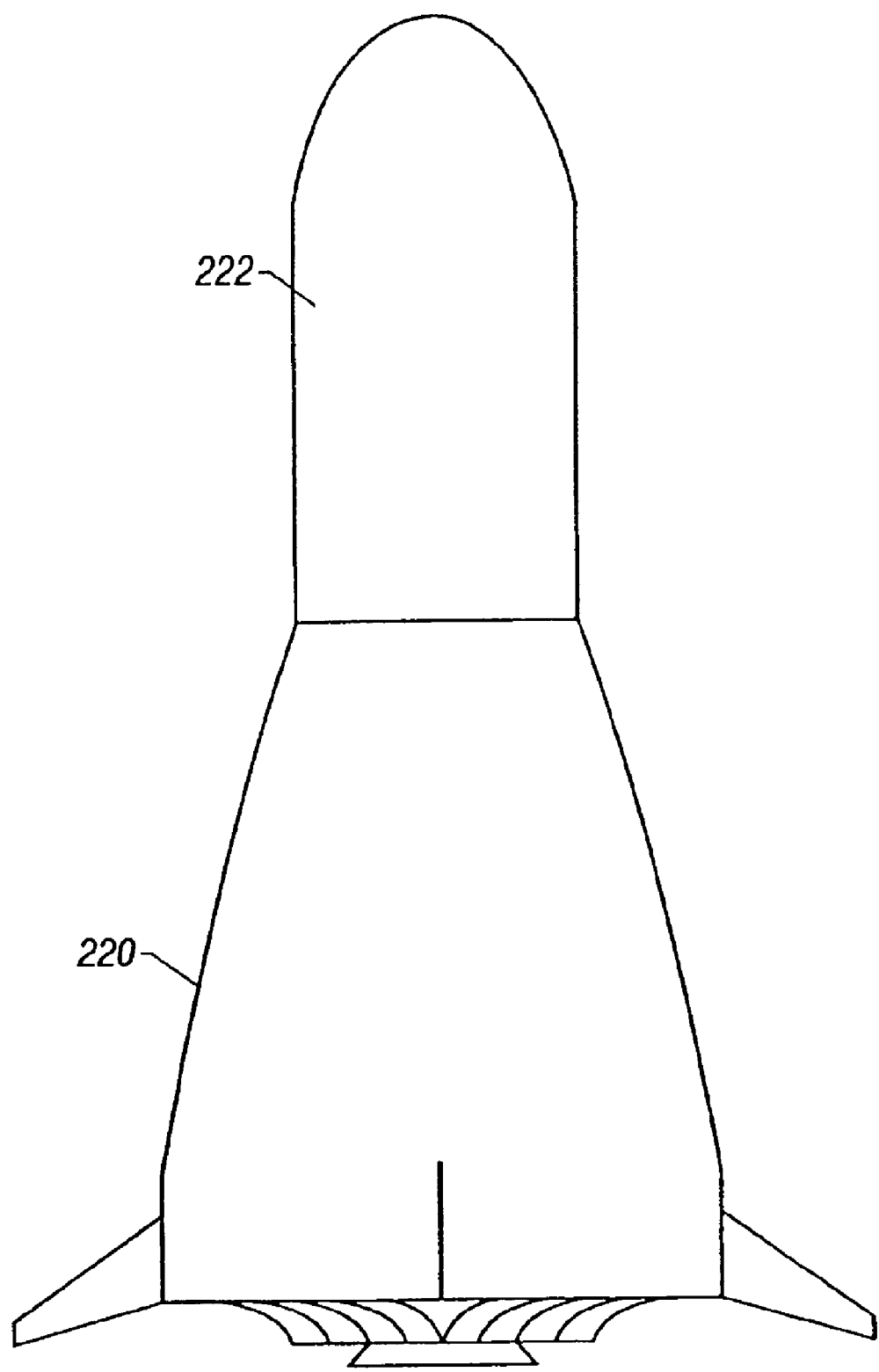
FIG. 22 is a side view of the space plane of FIGS. 21A and 21B further comprising an upper booster section.

In yet another embodiment, referring to FIG. 22, in addition to a linear aerospike engine and a bell-shaped nozzle engine, a space plane 220 may have a reusable booster 222. The booster 222 may be used to boost cargo or other payload into orbit. For example, once the space plane 220 reaches a certain, predetermined altitude, the booster 222 may be ignited to carry the cargo the rest of the distance into outer space. The booster 222 is then allowed to splash into the ocean or otherwise return to the ground and then reused for subsequent flights.

Figures 23A, 23B:
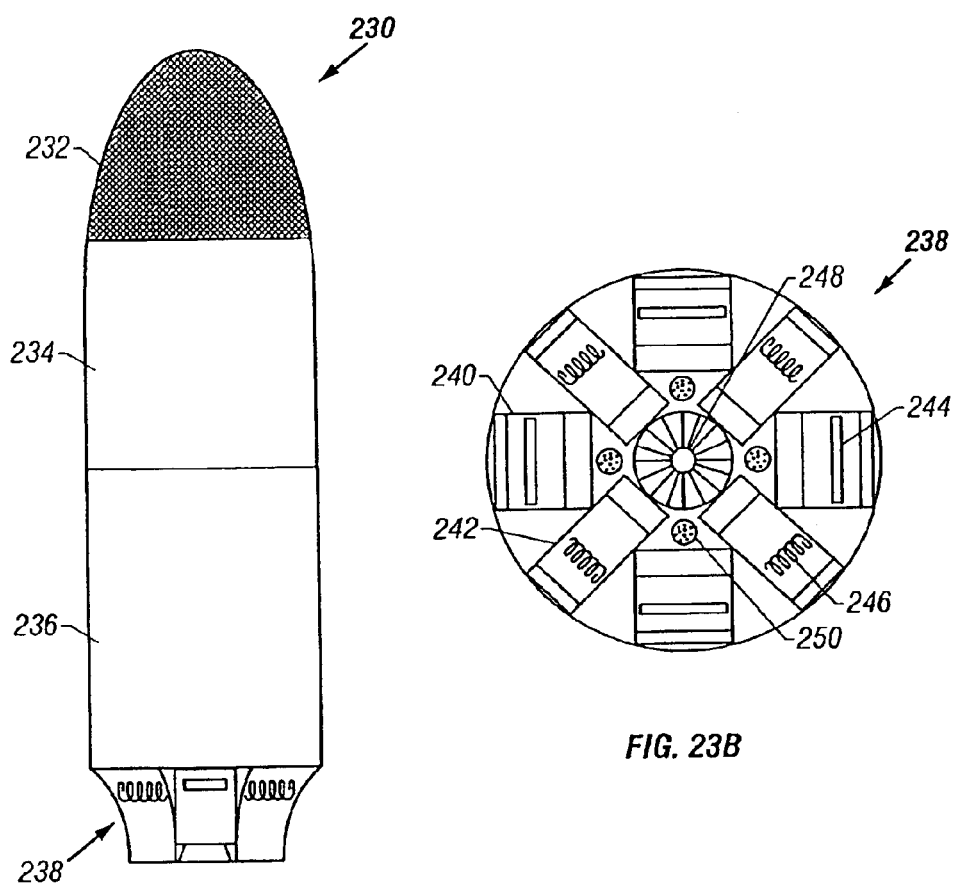
FIGS. 23A and 23B are front view and side view, respectively, of a space plane having a linear aerospike engine and a bell-shaped nozzle engine.

In a preferred embodiment, referring to FIG. 23A, a space plane 230 has a nose section 232, a cargo section 234, and a main body 236 having an engine assembly 238 attached thereto. The nose section of the space plane 230 is preferably made of a heat dissipating material that acts as a heat shield for the space plane 230. Referring now to FIG. 23B, the engine assembly 238 includes truncated linear aerospike engines 240 and extended linear aerospike engines 242, each of which are optimized to operate during a predetermined flight regime. The engine assembly 238 also has one or more rotatable turbines 244 attached to the engines 240, and one or more vortices 246 induced on the engines 242 to help inhibit boundary layer separation and/or increase the pressure on the engines 240, 242. The vortices 246 may be induced by, for example, pairs of injectors (not shown) directing fuel in counter current directions (see FIG. 5). The engine assembly 238 further includes a bell-shaped nozzle engine 248 at the center of the assembly and landing struts 250 disposed between the engines 242.

In operation, the engines 240 and 242 are preferably both fired at lift-off in order to obtain maximum thrust for take-off, but may alternatively be fired only during low and high altitude flight regimes, respectively, to carry the space plane 230 into orbit. Once in space, the bell-shaped nozzle engine 248 may be fired to propel the space plane 230 through space. Alternatively, the bell-shaped nozzle engine 248 may also be fired at lift-off, then cut back to, say, 50% capacity during atmospheric flight, and then given full throttle once the space plane reaches outer space.

Figure 24:
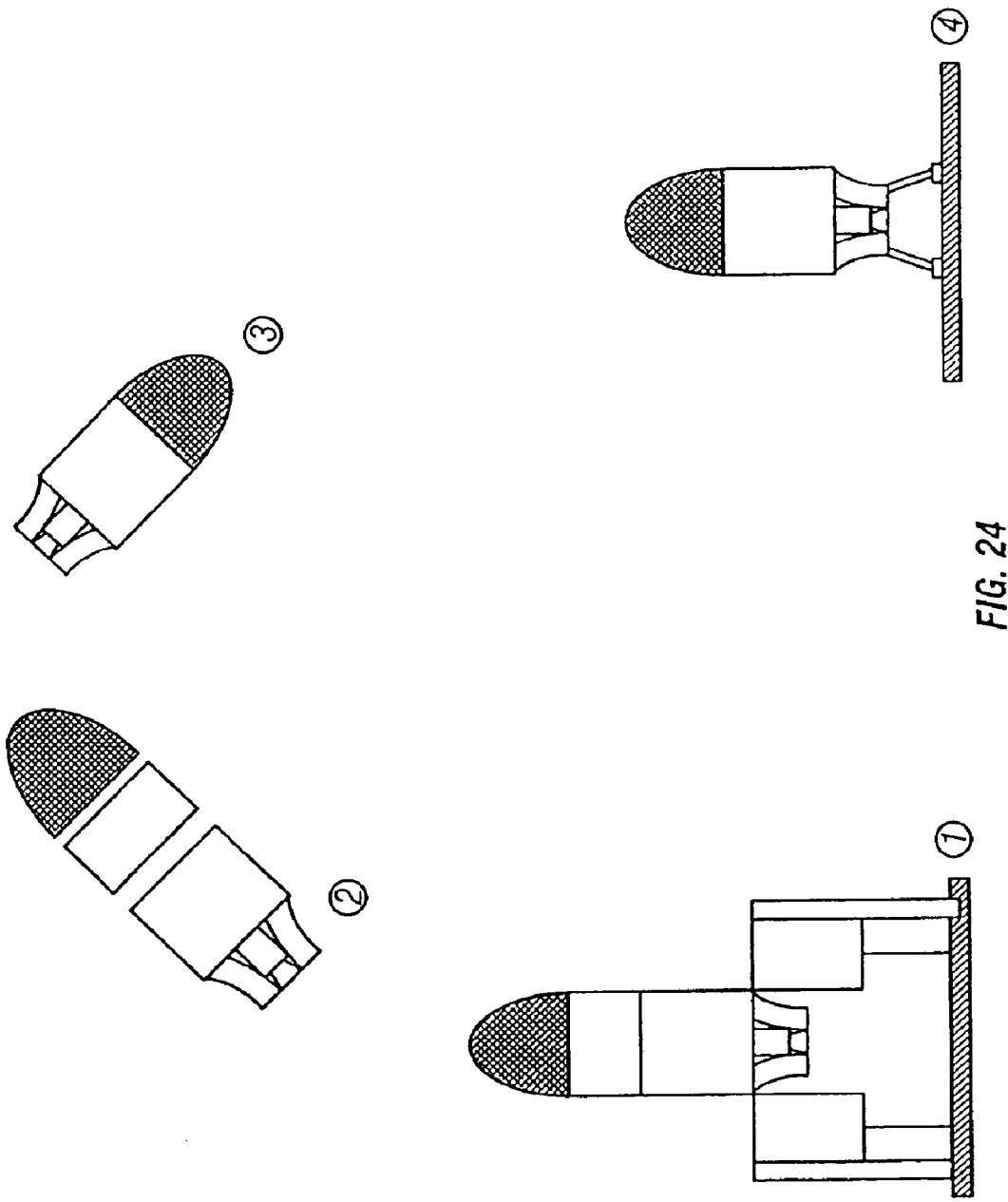
FIG. 24 shows the stages of the flight path of the space plane of FIGS. 23A and 23B.

The combination of the truncated and extended aerospike engines 240, 242, turbines 244, vortices 246, and the bell-shaped nozzle engine 248 opens the space plane 230 to creative and innovative applications that have heretofore not been technically feasible and/or cost effective with conventional rocket engines. For example, the space plane 230 may be used to tow large, heavy equipment (e.g., space station components) into orbit, or other applications where the space plane 230 cannot land in a conventional manner and must make an upright, decelerated landing ("pogo landing"). Referring to FIG. 24, such an application may generally include four stages. In stage 1, the space plane 230 takes off soars into outer space. During this stage, both engines 240, 242 may be operated during their respective flight regimes. Once in space, the cargo section 234 of the space plane 230 separates from the rest of the space plane 230 in stage 2. In stage 3, the nose section 232 and main body 236 of the space plane 230 reassemble and the space plane re-enters the atmosphere. The space plane 230 then makes an upright and decelerated landing using only the truncated engines 240 in stage 4.

In order to make such a decelerated landing, a predetermined amount of propellant must be carried in reserve on the space plane. Given a take-off mass of 100,000 lb., it is assumed that about 10% of that, or 10,000 lb., would be the re-entry weight, and 9,000 lb. would be the landing weight. Therefore, only up to 1,000 lb. of fuel and/or propellant (or 1% of the take-off mass) may be reserved on board for the landing. Table 3 below, going in reverse order from bottom to top, simulates such a landing and illustrates the fuel/propellant constraints involved. Each column of Table 3 represents the same parameters as the columns of Tables 1 and 2. The notable points of the pogo landing sequence are as follows: 1) after re-entry, the truncated engines 240 are fired when the free-fall velocity of the space plane 230 reaches approximately Mach 1.5 (1.165 ft./sec.), which will be at an altitude of approximately 30,580 ft.; 2) the initial thrust from the engines 240 is approximately 5,837 lb. with tanked $O_2$ making up 87% of the $O_2$ used and the balance coming from atmospheric $O_2$; 3) the landing thrust from the engines 240 is about 13,365 lb. with tanked $O_2$ making up 33% of the $O_2$ used; 4) the flow rate of fuel consumed increases with the decreasing percentage of tanked $O_2$ used as the space plane 230 gets closer to the ground; and 5) the total duration of the landing sequence is approximately 58 seconds.

TABLE 3

Pogo Landing

| Time (sec) | Time (min) | mass (lb) 100000 | $H_2 + O_2$ 0 60 lb/sec | % $H_2$ thst | $H_2$/thst 360 | HC + $O_2$ 1 18 lb/sec | A/fac 3.3 0.96 | % $O_2$ | HC/thst 225 250 | Tot/thst $H_2$ + HC | Acc xg | Vel ft/sec | 77% 6$O_2$ 192 % mass | 23% $C_4H_8$ = 56 H. dist * 1000 | 4$CO_2$ sum = fact | 4$H_2O$ 248 Height * 10 ft |
|---|---|---|---|---|---|---|---|---|---|---|---|---|---|---|---|---|
| 0 | 0 | 10000 | 0 | 100 | 0 | 10000 | 3.30 | 33 | 13365 | 13365 | 1.3 | 0 | 100 | 0 | 1 | 0 |
| 2 | 0 | 9964 | 0 | 100 | 0 | 9964 | 3.15 | 37 | 12742 | 12742 | 1.3 | 86 | 100 | 0.1 | 0.87 | 7 |
| 4 | 0 | 9928 | 0 | 100 | 0 | 9928 | 3.01 | 42 | 12171 | 12171 | 1.2 | 168 | 99 | 0.3 | 0.76 | 31 |

TABLE 3-continued

Pogo Landing

| Time (sec) | Time (min) | mass (lb) 100000 | $H_2 + O_2$ 0 60 lb/sec | % $H_2$ thst | $H_2$/thst 360 | $HC + O_2$ 1 18 lb/sec | A/fac 3.3 0.96 | % $O_2$ | HC/thst 225 250 | Tot/thst $H_2$ + HC | Acc xg | Vel ft/sec | 77% 6$O_2$ 192 % mass | 23% $C_4H_8$ = 56 H. dist * 1000 | 4$CO_2$ sum = fact 0.87 | 4$H_2O$ 248 Height * 10 ft |
|---|---|---|---|---|---|---|---|---|---|---|---|---|---|---|---|---|
| 6  | 0 | 9892 | 0 | 100 | 0 | 9892 | 2.88 | 45 | 11647 | 11647 | 1.2 | 247  | 99 | 0.7  | 0.66 | 76 |
| 8  | 0 | 9856 | 0 | 100 | 0 | 9856 | 2.76 | 49 | 11165 | 11165 | 1.1 | 323  | 99 | 1.2  | 0.57 | 143 |
| 10 | 0 | 9820 | 0 | 100 | 0 | 9820 | 2.65 | 52 | 10721 | 10721 | 1.1 | 396  | 98 | 1.8  | 0.50 | 230 |
| 12 | 0 | 9784 | 0 | 100 | 0 | 9784 | 2.55 | 55 | 10312 | 10312 | 1.1 | 466  | 98 | 2.4  | 0.43 | 336 |
| 14 | 0 | 9748 | 0 | 100 | 0 | 9748 | 2.45 | 58 | 9933  | 9933  | 1.0 | 534  | 97 | 3.2  | 0.38 | 458 |
| 16 | 0 | 9712 | 0 | 100 | 0 | 9712 | 2.37 | 60 | 9583  | 9583  | 1.0 | 600  | 97 | 4.1  | 0.33 | 591 |
| 18 | 0 | 9676 | 0 | 100 | 0 | 9676 | 2.29 | 62 | 9259  | 9259  | 1.0 | 663  | 97 | 5.0  | 0.29 | 734 |
| 20 | 0 | 9640 | 0 | 100 | 0 | 9640 | 2.21 | 65 | 8957  | 8957  | 0.9 | 725  | 96 | 6.0  | 0.25 | 882 |
| 22 | 0 | 9604 | 0 | 100 | 0 | 9604 | 2.14 | 67 | 8677  | 8677  | 0.9 | 785  | 96 | 7.0  | 0.22 | 1035 |
| 24 | 0 | 9568 | 0 | 100 | 0 | 9568 | 2.08 | 69 | 8417  | 8417  | 0.9 | 843  | 96 | 8    | 0.19 | 1188 |
| 26 | 0 | 9532 | 0 | 50  | 0 | 9532 | 2.02 | 70 | 8174  | 8174  | 0.9 | 900  | 95 | 9    | 0.16 | 1341 |
| 28 | 0 | 9496 | 0 | 50  | 0 | 9496 | 1.96 | 72 | 7948  | 7948  | 0.8 | 955  | 95 | 11   | 0.14 | 1491 |
| 30 | 1 | 9460 | 0 | 50  | 0 | 9460 | 1.91 | 73 | 7736  | 7736  | 0.8 | 1009 | 95 | 12   | 0.12 | 1638 |
| 32 | 1 | 9424 | 0 | 50  | 0 | 9424 | 1.86 | 75 | 7539  | 7539  | 0.8 | 1062 | 94 | 13   | 0.11 | 1780 |
| 34 | 1 | 9388 | 0 | 50  | 0 | 9388 | 1.82 | 76 | 7354  | 7354  | 0.8 | 1113 | 94 | 15   | 0.09 | 1916 |
| 36 | 1 | 9352 | 0 | 50  | 0 | 9352 | 1.77 | 77 | 7180  | 7180  | 0.8 | 1164 | 94 | 16   | 0.08 | 2047 |
| 38 | 1 | 9316 | 0 | 50  | 0 | 9316 | 1.73 | 79 | 7018  | 7018  | 0.8 | 1213 | 93 | 18   | 0.07 | 2171 |
| 40 | 1 | 9280 | 0 | 50  | 0 | 9280 | 1.70 | 80 | 6865  | 6865  | 0.7 | 1262 | 93 | 19   | 0.06 | 2289 |
| 42 | 1 | 9244 | 0 | 50  | 0 | 9244 | 1.66 | 81 | 6722  | 6722  | 0.7 | 1309 | 92 | 21   | 0.05 | 2400 |
| 44 | 1 | 9208 | 0 | 50  | 0 | 9208 | 1.63 | 82 | 6587  | 6587  | 0.7 | 1356 | 92 | 22   | 0.05 | 2504 |
| 46 | 1 | 9172 | 0 | 100 | 0 | 9172 | 1.60 | 83 | 6460  | 6460  | 0.7 | 1402 | 92 | 24   | 0.04 | 2601 |
| 48 | 1 | 9136 | 0 | 100 | 0 | 9136 | 1.57 | 84 | 6340  | 6340  | 0.7 | 1447 | 91 | 26   | 0.04 | 2692 |
| 50 | 1 | 9100 | 0 | 100 | 0 | 9100 | 1.54 | 84 | 6228  | 6228  | 0.7 | 1492 | 91 | 28   | 0.03 | 2777 |
| 52 | 1 | 9064 | 0 | 100 | 0 | 9064 | 1.51 | 85 | 6121  | 6121  | 0.7 | 1536 | 91 | 29   | 0.03 | 2856 |
| 54 | 1 | 9028 | 0 | 100 | 0 | 9028 | 1.49 | 86 | 6021  | 6021  | 0.7 | 1580 | 90 | 31   | 0.02 | 2929 |
| 56 | 1 | 8992 | 0 | 100 | 0 | 8992 | 1.46 | 86 | 5926  | 5926  | 0.7 | 1623 | 90 | 33   | 0.02 | 2996 |
| 58 | 1 | 8956 | 0 | 100 | 0 | 8956 | 1.44 | 87 | 5837  | 5837  | 0.7 | 1665 | 90 | 35   | 0.02 | 3058 |

From Table 3, it is clear that such a landing will be technically and economically feasible only by implementing the various embodiments of the invention, including using: a) dual fuels with induced air in lieu of tanked $O_2$ to enhance combustion of the less expensive/cumbersome hydrocarbon fuel; b) reaction plane lengths optimized for specific flight regimes; and c) means for inhibiting boundary layer separation.

It is to be understood that the embodiments described above are merely illustrative and that other arrangements can be devised by one of ordinary skill in the art at the time the invention was made without departing from the scope of the invention. For example, the embodiments described throughout the description may be implemented with either double-sided engines or single-sided engines, and each of the embodiments may be implemented either separately or in conjunction with one another, without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A space plane, comprising:
   a main body;
   an aerospike engine attached to the main body; and
   a bell-shaped nozzle primary thrust engine attached to the main body.

2. The space plane of claim 1, wherein the aerospike engine includes a tapered body and a slanted reaction plane on the tapered body, further comprising means for increasing propulsive pressure on the reaction plane.

3. The space plane of claim 1, wherein the aerospike engine further comprises means for inhibiting boundary layer separation.

4. A method of operating a space vehicle having a tapered engine body which has a slanted reaction plane, comprising:
   firing the engine;
   extending a length of the reaction plane at a predetermined time; and
   removing decelerated boundary layer fluid from a boundary layer while the reaction plane is extended.

5. The method of claim 4, wherein the decelerated boundary layer fluid is removed by using slits in an extended portion of the reaction plane.

6. The method of claim 4, further comprising selectively adapting a length of the reaction plane.

7. The method of claim 4, further comprising selectively adapting a thrust of the engine while the space vehicle is in flight.

8. The method of claim 4, wherein the space plane includes a bell-shaped nozzle main thrust engine and further comprising firing the bell-shaped nozzle main thrust engine essentially simultaneously with the engines.

9. The method of claim 4, wherein the space plane includes a bell-shaped nozzle main thrust engine, further comprising firing the bell-shaped nozzle main thrust engine once the space plane reaches outer space.

* * * * *